United States Patent
Tanaka

(10) Patent No.: US 7,376,189 B2
(45) Date of Patent: May 20, 2008

(54) REMOTE CONTROL SIGNAL RECEPTION CIRCUIT, REMOTE CONTROL SIGNAL RECEPTION METHOD, REMOTE CONTROL SIGNAL RECEPTION PROGRAM, AND COMPUTER-READABLE STORAGE MEDIUM STORING THE PROGRAM

(75) Inventor: Hiroshi Tanaka, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 695 days.

(21) Appl. No.: 10/936,560

(22) Filed: Sep. 9, 2004

(65) Prior Publication Data

US 2005/0058223 A1 Mar. 17, 2005

(30) Foreign Application Priority Data

Sep. 11, 2003 (JP) ............................. 2003-320342

(51) Int. Cl.
*H04B 14/04* (2006.01)
(52) U.S. Cl. .................. 375/243; 375/355; 341/155
(58) Field of Classification Search ................ 375/243, 375/245, 316, 317, 320, 355; 341/155
See application file for complete search history.

(56) References Cited

U.S. PATENT DOCUMENTS 7,030,800 B2 * 4/2006 Arai et al. .................. 341/155

FOREIGN PATENT DOCUMENTS

| JP | 60-111539 | | 6/1985 |
| JP | 4-302525 A | | 10/1992 |
| JP | 2000-350052 | | 12/2000 |
| JP | 2001-145184 A | | 5/2001 |
| WO | WO 03/067764 | * | 8/2003 |

* cited by examiner

*Primary Examiner*—Kevin Kim
(74) *Attorney, Agent, or Firm*—Birch, Stewart, Kolasch & Birch, LLP

(57) ABSTRACT

The subject invention provides a remote control signal reception circuit that carries out quantization of an input data signal 101 by sampling the signal with a first sampling frequency that is higher than a frequency of said input data signal, and stores a result of the quantization 105 in storing means; and then, the result of the quantization 105 stored in said storing means is corrected according to each result, and is outputted as quantization data 106. In this way, the present invention provides an infrared light reception unit that achieves highly-faithful reproduction of the original waveform, allowing multi-stages transmission in a simple manner.

50 Claims, 10 Drawing Sheets

REMOTE CONTROL SIGNAL RECEPTION CIRCUIT, REMOTE CONTROL SIGNAL RECEPTION METHOD, REMOTE CONTROL SIGNAL RECEPTION PROGRAM, AND COMPUTER-READABLE STORAGE MEDIUM STORING THE PROGRAM

This Nonprovisional application claims priority under 35 U.S.C. § 119(a) on Patent Application No. 2003/320342 filed in Japan on Sep. 11, 2003, the entire contents of which are hereby incorporated by reference.

FIELD OF THE INVENTION

The present invention relates to a remote control signal reception circuit, a remote control signal reception method, a remote control signal reception program, and a computer-readable storage medium storing the program, that achieve highly-faithful reproduction of the original waveform, thus allowing multi-stages transmission.

BACKGROUND OF THE INVENTION

An infrared remote control unit (generally simply called an infrared remote controller or a remote controller; hereinafter referred to as a remote controller) is a general equipment for a video device or an air conditioner to enable remote manipulation of the device. Normally, a remote controller modulates data of an infrared pulse sequence having a predetermined period, approximately 38 kHz, with an ON/OFF operation by a longer period, and then transmitting the modulated data to a remote control signal reception device such as a TV set.

Receiving the modulated data, the reception device demodulates the data, denoting ON with repeated pulses of about 38 kHz, into a signal with a smooth pulse from the beginning to end, before supplying the data to a decoding device.

In this way, the ON and OFF states are temporarily converted into digital signals of "H" level and "L" level, respectively, and then are supplied to a microprocessor provided inside the reception machine as remote control signals, and the remote control code of the signal is deciphered to interpret the command. PWM (Pulse Width Modulation) is a modulation mode using a rising point of the ON signal. PPM (Pulse Position Modulation) uses positions of a constant-sized pulse.

As may be seen, the period with a continuous pulse and the period with no discharge of pulse are very important in terms of proper decoding of the remote control signal in a later-stage circuit. Further, in PPM, pulse-size needs to be properly transmitted, otherwise accurate detection of the position fails.

Incidentally, conversion of the pulse into a smoothed signal denoting "H" level is generally performed by using a characteristic of the capacitor. Once change is accumulated in the capacitor, the output level dos not rapidly decrease even when the pulse turns OFF in a moment, as long as the capacitor holds the charge. Therefore, by appropriately setting the threshold, it is possible to digitally keep it in "H" level, as long as the pulse continues.

However, on the contrary, it is digitally maintained at "H" level even when the pulse ends until the charge of the capacitor is discharged, and the output level falls below the threshold. Accordingly, even when the transmission end transmits a regular ON-time signal, the "H" level signal in the receiving end becomes slightly longer due to the characteristic of the reception side. Further, as a result, the "L" level signal becomes shorter than its original regular signal. This defect is publicly-known, and is disclosed in, for example, Japanese Laid-Open Patent Application Tokukai 2001-145184 (published on May 25, 2001).

Here, the following describes conversion of the pulse into a smooth signal denoting "H" level, with reference to a part of FIG. 1.

In FIG. 1, the reference numeral 100 is an infrared pulse transmitted from a remote control transmission machine, that is generally a carrier of frequency of approximately 38 kHz (generally approximately 38 kHz-40 kHz). In the figure, the reference numeral 101 denotes a waveform having been smoothed by a smoothing circuit (not shown) including a condenser.

In the signal denoted by the reference numeral 101, the voltage gradually decreases in the portion corresponding to the trough of the infrared light pulse. However, the threshold value denoted by the reference numeral 103 (uniform voltage) is set so that the next pulse comes before the output voltage comes at or lower than the threshold value. After the pulse stops, the condenser carries out discharging at a certain time constant, and therefore it takes a little while for the voltage to decrease to "L" level (low-level).

The reference numeral 102 is a digitalized waveform of the output voltage (denoted by the reference numeral 101) of the smoothing circuit, created based on level comparison with the threshold value denoted by the reference numeral 103. As explained, it takes a certain time (denoted by the reference numeral 104) for the output voltage to decrease to or below the threshold value due to the characteristic of the condenser, and therefore, "H" level (high-level) period of the waveform 102 is extended by the period of the reference numeral 104, compared to the waveform denoted by the reference numeral 100.

To deal with such a characteristic, the receiving end needs to carry out decoding of the received signal in consideration of such difference with the original signal. In a general use, the problem may be solved in the remote control signal receiving end with a relatively simple arrangement corresponding to the degree of extension of the period of "H" level.

However, in a recent remote control technology, the signal transmitted from the remote controller is not simply processed directly in the general receiving end, but transferred to the receiving end via a separate device. For example, "Liquid Crystal FACE Wireless" (liquid crystal TV), a product of TOSHIBA, that became commercially available in September 2002, is equipped with a function called a 'Remote Control Pass-Through (http://www.toshiba.co.jp/webcata/ctv/201f10.htm)". In this function, the signal operated by a user using a remote controller is temporary received in a TV image reception machine, and then transmitted via a wireless medium to an image transmission machine or the like provided in front of a different device, such as a VCR.

This image transmission machine transmits the received remote control signal via the built-in remote control transmission machine while maintaining the original condition of the signal as much as possible. In the case of the foregoing example, it is assumed that the user watches a video image with a liquid crystal TV, that is distant from the VCR and the image transmission machine. When the user gives some kind of instruction, such as "pause" through the remote controller of the video, the instruction signal is temporarily received in the image/infrared signal reception machine included in the liquid crystal TV, and the signal is transferred to the image transmission machine by an electric wave. As a result, an infrared signal corresponding to the received signal is transmitted from a remote control transmission machine included in the image transmission machine. Then, the machine (VCR in this case) that received the infrared signal carries out operation of "pause", as if the machine directly receives instruction of "pause" from the remote controller of the VCR.

The problem raised here is the error of the "H" level period in reception of the infrared light. A general structure assuming direct operation of the remote controller is designed with a margin to handle a stage of delay of relay transmission; however, the foregoing "Remote Control Pass-Through Function" requires the infrared light reception twice, thus increasing the error. The allowable range of the error differs for each case, and therefore, the user has to confirm proper operation of the system by referring to experiences, or by carrying out some kind of test. This problem is disclosed in the Japanese Laid-Open Patent Application Tokukai 2001-145184 in detail and some other publications.

To solve this problem, various methods have been proposed. For example, Japanese Laid-Open Patent Application Tokukaihei 04-302525/1992 (published on Oct. 26, 1992) discloses a pulse demodulation circuit that achieves reduction of the concerned false "H" period after termination of the pulse by using a constant-current load circuit and a limiter circuit. Further, the Tokukai 2001-145184 discloses a particular method to be used with the 'Remote Control Pass-Through' function.

However, the foregoing prior art has the following problems. The method of Tokukaihei 04-302525 achieves reduction of the concerned period; however, since the delay can still not be reduced to 0, this cannot completely solve the problem. For example, when the method is adopted for multi-stages relay operation, the error may be accumulated, causing some kind of defect.

Further, the method of Tokukai 2001-145184 gives up reduction of the concerned period, and instead intentionally causes a delay of the start time for the same length as the period, thereby matching the "H" level period with the time intended in the receiving end of the remote control signal.

However, to cause such a delay of the start time, this method requires adjustment of the capacitor, the resistor, and the reference voltage. Besides, such adjustment is performed in an analog manner, that may not be highly compatible with a digitalized device, and also may require a larger number of components.

Further, decipher of a remote control signal is generally performed by a CPU or a dedicated IC. Since, the capacitor or the resistor are not suitable to be included in these digital ICs, it increases manufacturing cost.

Furthermore, when such a circuit is provided in a semiconductor, the characteristic varies, and there will be some difficulties for adjustment. Since a recent technology uses various photoelectric conversion elements for converting an infrared light to an electric signal, those defects prevent the circuit from adjustment for each type of element.

SUMMARY OF THE INVENTION

An object of the present invention is to provide a remote control signal reception circuit, a remote control signal reception method, a remote control signal reception program, and a computer-readable storage medium storing the program, that achieve highly-faithful reproduction of the original waveform, allowing multi-stages transmission in a simple manner.

In order to achieve the foregoing object, a remote control signal reception circuit according to the present invention includes: first sampling means for sampling an input data signal to carry out quantization of said input data signal using a first sampling frequency that is higher than a frequency of said input data signal, and storing a result of the quantization in storing means; and correcting means for carrying out correction of said result of the quantization stored in said storing means according to each result, and outputting a result of the correction as quantization data.

According to this invention, the first sampling means samples the received input data signal to carry out quantization of said input data signal using a first sampling frequency, and stores the result of the quantization in storing means. Then, the correcting means carries out correction of the result of the quantization stored in the storing means, and outputs the result of the correction as quantization data.

Since the correction of the quantized data is carried out with reference to the result of quantization stored in the storing means, the correction is performed in a digital manner.

Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

In order to achieve the foregoing object, a remote control signal reception circuit according to the present invention includes: a sampling circuit including a plurality of flip-flops, connected to one another in a cascade manner, for sampling an input data signal using a first sampling frequency that is higher than a frequency of said input data signal, based on a clock signal having the first sampling frequency, and outputting an output signal of a final-stage flip-flop as quantization data; and an AND circuit for carrying out AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

In order to achieve the foregoing object, another remote control signal reception circuit according to the present invention includes: first sampling means for sampling an input data signal to carry out quantization of said input data signal using a first sampling frequency that is higher than a frequency of said input data signal, and outputting a result of the quantization as quantization data; and correcting means for detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

According to this invention, the first sampling means samples the received input data signal to carry out quantization of the input data signal using a first sampling frequency, and outputs the result as quantization data. Upon detection of a change of the quantization data from low-level to high-level, the correcting means modifies a predetermined number of results of the quantization from high-level to low-level, which number is counted forward from the change from low-level to high-level in units of a sampling period of the first sampling means, and outputs a result of modification as the quantization data.

Since the correction of the quantized data is carried out with reference to the result of quantization, the correction is performed in a digital manner. Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

Besides, since the circuit does not require storing means for storing the quantized data regardless of the correction amount, it may be constituted as a simple structure.

In order to achieve the foregoing object, a remote control signal reception method according to the present invention includes the steps of: (a) sampling an input data signal to carry out quantization of said input data signal using a first sampling frequency that is higher than a frequency of said input data signal, and storing a result of the quantization; and (b) carrying out correction of said result of the quantization that has been stored according to each result, and outputting a result of the correction as quantization data.

According to this invention, in the first sampling step, the received input data signal is subjected to quantization by being sampled with a first sampling frequency, and this result is stored. Then, the stored quantized data is subjected to correction with reference to the result of quantization in the correcting step, and is outputted as quantization data.

Since the correction of the quantized data is carried out with reference to the stored result of quantization, the correcting step is performed in a digital manner.

Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

In order to achieve the foregoing object, a remote control signal reception method according to the present invention includes the steps of: (a) carrying out sampling by a plurality of flip-flops, connected to one another in a cascade manner, with respect to an input data signal using a first sampling frequency that is higher than a frequency of said input data signal, based on a clock signal having the first sampling frequency, and outputting an output signal of a final-stage flip-flop as quantization data; and (b) carrying out an AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

In order to achieve the foregoing object, another remote control signal reception method according to the present invention includes the steps of: (a) sampling an input data signal to carry out quantization of said input data signal using a first sampling frequency that is higher than a frequency of said input data signal, and outputting a result of the quantization as quantization data; and (b) detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

According to this invention, in the first sampling step, the received input data signal is subjected to quantization by being sampled with a first sampling frequency, and then is outputted as quantization data. Upon detection of a change of the quantization data from low-level to high-level, modification is carried out as a correcting step with respect to a predetermined number of results of the quantization from high-level to low-level, which number is counted forward from the change from low-level to high-level in units of a sampling period of the first sampling means, and a result of modification is outputted as the quantization data.

Since the correction of the quantized data is carried out with reference to the result of quantization, the correction is performed in a digital manner. Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

Besides, since the method does not need to perform a storing step for storing the quantized data regardless of the correction amount, it may be carried out as a simple method.

In order to achieve the foregoing object, a remote control signal reception program according to the present invention enforces one of the foregoing remote control signal reception circuits by causing a computer to function as the respective means or the circuit.

This program enforces the foregoing remote control signal reception circuit by causing a computer to function as the respective means or the circuit, thus realizing the foregoing remote control signal reception circuit.

In order to achieve the foregoing object, a computer-readable storage medium according to the present invention stores the foregoing remote control signal reception program.

By reading out the remote control signal reception program from the foregoing storage medium, the foregoing remote control signal reception circuit may be realized on a computer.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 9 is a waveform chart showing operation of the main part of FIG. 8.

DESCRIPTION OF THE EMBODIMENTS

One embodiment of the present invention is described below in detail.

Figure 1:
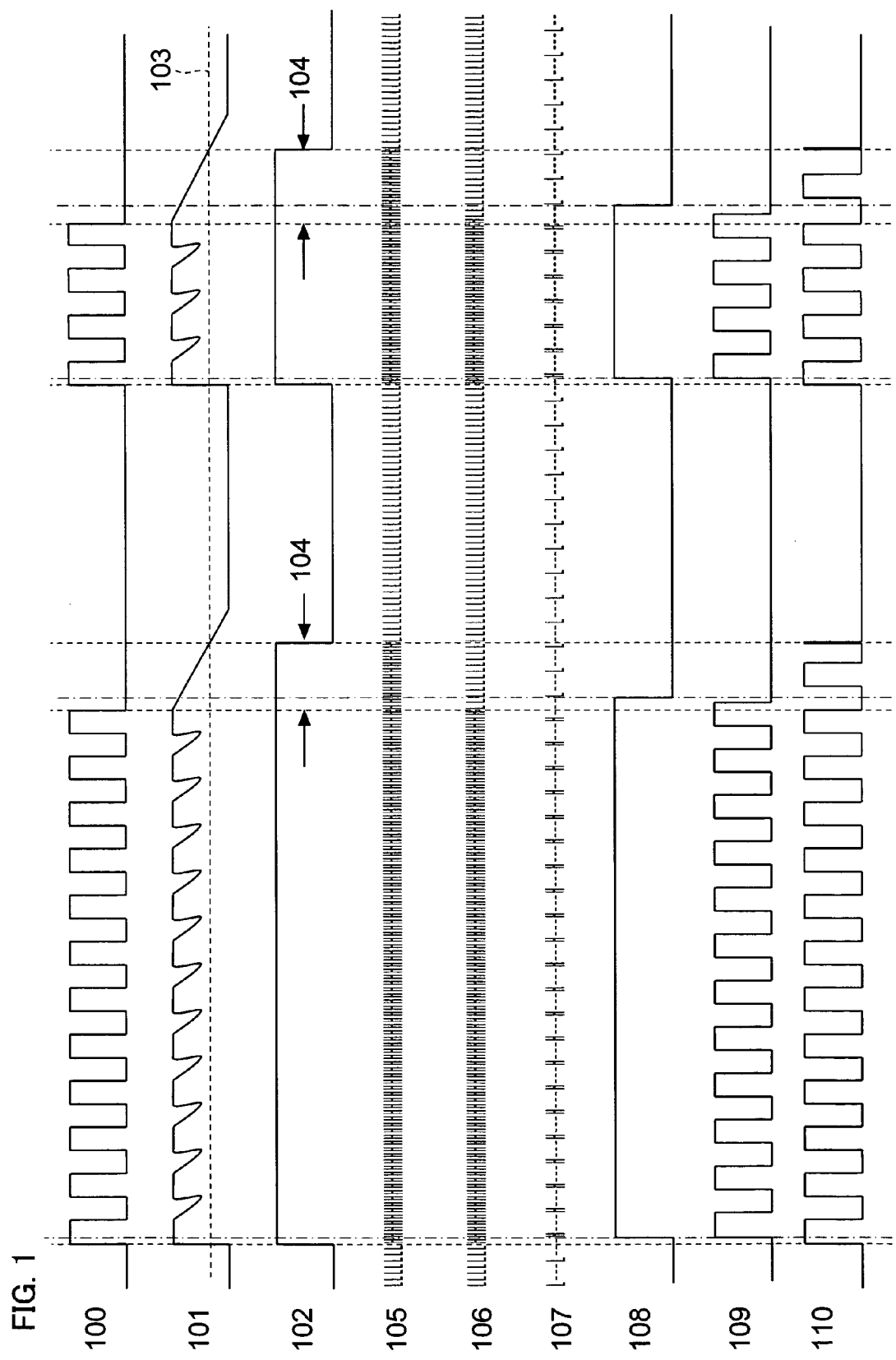
FIG. 1 is a waveform chart showing an example of operation of the main part of a remote control signal reception circuit according to the present invention.

FIG. 1 shows a part of the major section of a waveform in the conventional remote control signal reception method. With this figure, the following again explains the conventional method and waveform thereof in comparison with the waveform obtained in the method of the present invention, so as to clearly show the characteristic of the present invention.

The reference numeral 100 is a waveform of an infrared light pulse transmitted from a remote control transmission machine, that generally uses a carrier of frequency of approximately 38 kHz (generally approximately 38 kHz-40 kHz). In the figure, the reference numeral 101 denotes a waveform having been smoothed by a smoothing circuit (not shown) including a condenser.

In the output voltage (the waveform denoted by the reference numeral 101) of the smoothing circuit above, the output voltage gradually decreases in the portion corresponding to the trough of the infrared light pulse. However, the threshold value denoted by the reference numeral 103 (uniform voltage) is set so that the next pulse comes before the output voltage becomes at or lower than the threshold value. After the infrared light pulse stops, the condenser carries out discharging at a certain time constant, and therefore it takes a little while before the output voltage decreased to "L" level (low-level).

The reference numeral 102 is a digitalized waveform of the output voltage of the smoothing circuit, created based on level comparison with the threshold value denoted by the reference numeral 103. As explained, it takes a certain time (denoted by the reference numeral 104, corresponding to the error amount) for the output voltage to decrease to or below the threshold value due to the characteristic of the condenser. Accordingly, the waveform 102 is in "H" level (high-level) for a longer period than the waveform (denoted by the reference numeral 100) of the infrared pulse.

Incidentally, the characteristic of the portion corresponding to the error denoted by the reference numeral 104 greatly varies depending on the type of the photoreceptor of the infrared light pulse. As many manufacturers make many kinds of photoreceptor with different characteristics, it is hard to specify the level of the error.

However, the characteristic of the photoreceptor is identical in the same type, and the characteristic of the condenser included in the smoothing circuit used with the photoreceptor may also be decided by the designer at the same time. Therefore, the error amount may be substantially equalized for a certain type of the TV, video, or other devices containing the reception part of the infrared remote control.

Here, the following describes a remote control signal reception circuit according to the present invention. First, the reference numeral 105 shown in FIG. 1 is a result of quantization using a separately-set first sampling frequency 1, with respect to a signal having the waveform denoted by the reference numeral 102 (the digitalized output voltage of the smoothing circuit). The quantization result is expressed as "H" in the case of a high level, and is expressed as "L" in the case of a low level.

The period (hereinafter referred to as a sampling period (1) for ease of explanation) of the sampling frequency 1 is denoted by the length of the H/L letter of the 105. The sampling period (1) needs to be decided in consideration of the period of the original signal input data signal) and the error denoted by the reference numeral 104.

For example, when the original signal has a long period, i.e., when the data rate is of low-speed, the error ratio denoted by the reference numeral 104 in each of the "H" period (high-level period) of the reference numeral 102 becomes small. In this case, a slight amount of error may be ignored due to the low-speed of the data rate. Further, even when the error needs to be taken into account, it does not need to be accurately measured, and thus the sampling period may be set to a large value.

On the other hand, when the original signal has a short period, i.e., when the data rate is of high-speed, ratios of information and error are close, and therefore error-detection can easily occur. Thus, it is necessary to remove the error more strictly. The sampling period needs to be much smaller than the error; otherwise the measurement and correction of the error cannot be properly performed.

For example, when transmitting "H" (high-level) of 1 bit, if assuming that the "H" period is 1000 ms and the error part denoted by the reference numeral 104 is 100 ms, the "H" period is extended by 10%. This extension is not strictly required to be removed.

On the other hand, if assuming that the "H" period is 200 ms and the error part denoted by the reference numeral 104 is again 100 ms, the period becomes 300 ms. In this case, it is necessary to strictly judge whether it is 1 bit time or 2 bit time, otherwise the data cannot be accurately decoded to recover the original signal.

Further, the error amount 100 ms may be counted as 10×10 ms, or 2×50 ms, depending on the size of the error part itself and also depending on the data transmission time for the information as mentioned above. Increase in speed makes it possible to more strictly measure the error; however, it may be over-spec in some cases, thus requiring a high-speed CPU/circuit. For this reason, it is preferable that a suitable sampling period is decided with an appropriate experiment.

Further, the error part of the reference numeral 104 is previously measured in terms of the number of the signal quantized by the sampling period (1). This measurement may be performed by calculation based on the characteristics etc. of the photoreceptor, or by an experiment. In the case of the experiment, an existing remote control waveform is transmitted, and then is smoothed and digitalized signal to become the signal of the reference numeral 102. Then, this signal is compared to the waveform of the signal upon transmission. In this way, it is possible to easily find the error amount denoted by the reference numeral 104. Further, by dividing the amount by the sampling period (1), the correction amount for the error may be found.

The following explains the example of FIG. 1, assuming that the error amount denoted by the reference numeral 104 has already been found as: sampling period ×11, with the prior experiment.

Figure 3:
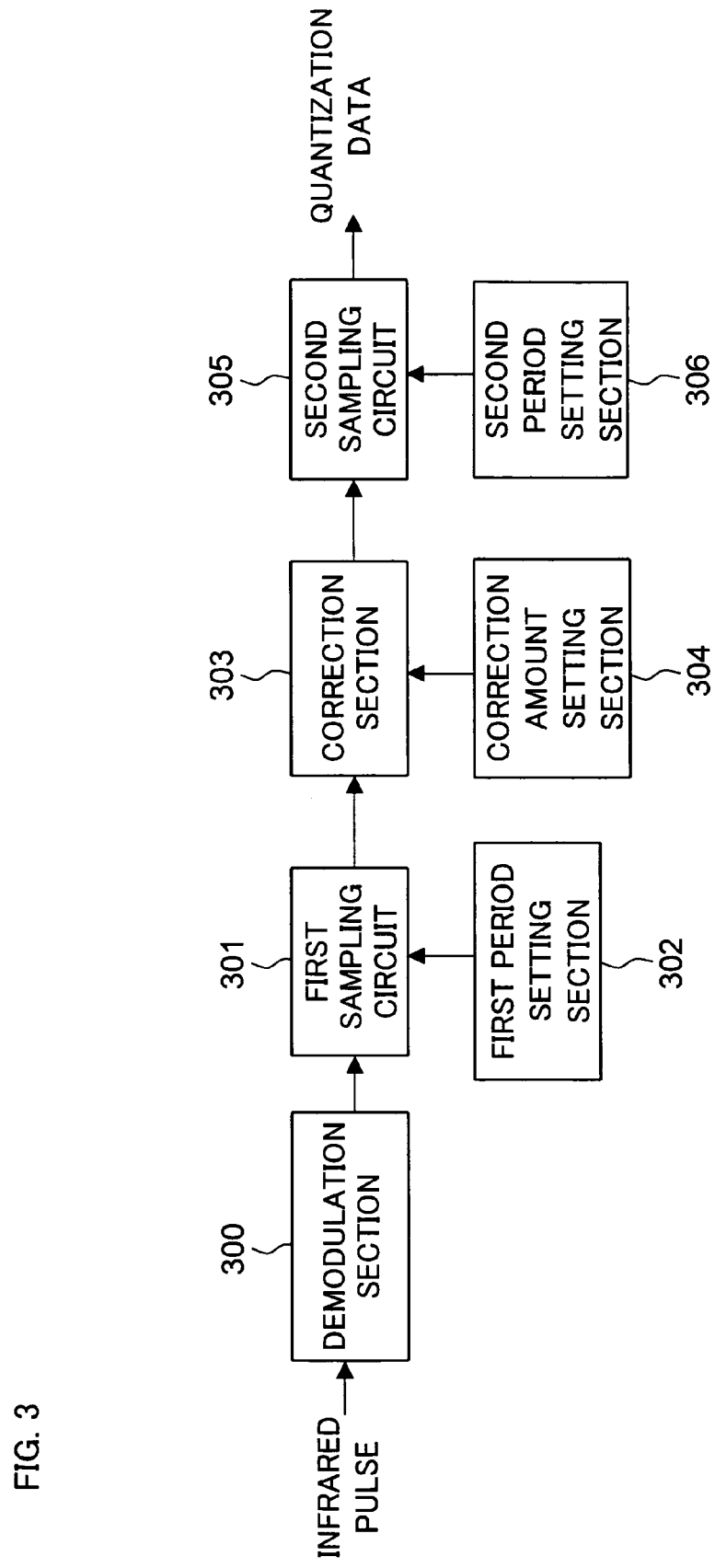
FIG. 3 is a block diagram illustrating a structure example of the remote control signal reception circuit.

Then, the information that the error amount denoted by the reference numeral 104=sampling period (1)×11 (11 periods correction from H to L) is stored in a correction amount setting section (see the reference numeral 304 of FIG. 3). As described, the correction amount setting section may be a circuit capable of externally setting the correction amount prior to the enforcement, or, if the characteristic is well-known, may carry out the correction based on a predetermined value. Note that, the arrangement having the correction amount setting section allows flexible change according to a change in specification of a circuit for supplying an input data signal.

Upon detection of a change from "H" level to "L" level in the signal having been quantized by the sampling period (1), according to the correction amount of the correction amount setting section; in this example, the correction section (see the reference numeral 303 of FIG. 3) carries out correction (modification) from the "H" level to "L" level for 11 periods before detection of the change, in the quantized data.

In FIG. 1, the reference numeral 106 denotes the result of the foregoing correction. The signal denoted by the reference numeral 106 becomes substantially equal to the original signal of the remote control transmission machine, though it depends on the accuracy of the sampling period (1). As can be seen, a shorter sampling period (1) makes it possible to more accurately estimate the error amount denoted by the reference numeral 104, resulting in a waveform more similar to that the remote control transmission machine intended.

Note that, the sampling frequency 1 is preferably obtained by dividing the system clock by sampling frequency producing means. In this case, the sampling frequency 1 can be obtained by dividing the system clock, and therefore a separate circuit or the like for producing a reference clock signal is not required.

Further, the value of the sampling frequency 1 may be fixed, or may be variable (see a first period setting section 302 of FIG. 3) to enable external setting. This allows flexible change according to a change in specification of a circuit for supplying an input data signal.

The corrected quantized data can be transmitted without modification of the data amount; however, in this case, the data amount increases as the sampling frequency 1 increases, and this further causes an increase of required storage capacitance. Therefore, for example, it is not preferable that the corrected quantized data is transmitted without modification of the data amount especially in the case of using a relay point in transmitting the signal in the described remote control pass-through function.

Further, when using a relay point in transmitting the signal in the remote control pass-through function, the corrected quantized data is preferably re-quantized through sampling by the sampling frequency 2 (second sampling). The value of the sampling frequency 2 may be fixed, or may be variable (see a second period setting section 306 of FIG. 3) to enable external setting. This allows flexible change according to a change in specification of a circuit for supplying an input data signal.

As to the method for setting the sampling frequency 2, the following factors need to be taken into account. Firstly, it must be smaller than the sampling frequency 1 in terms of reduction of data amount. Secondly, it must be higher than the frequency of the original signal (input data signal). Accurate transmission of the frequency of the original signal conflicts with reduction of the data amount, and therefore, the frequency needs to be carefully decided in consideration of accurate transmission of the original signal.

More specifically, the determination of the sampling frequency 2 greatly depends on the transmission rate of the original signal (remote control signal data) as well as the desired data amount after the second sampling.

Here, it is assumed that, through the first sampling and the correction, a waveform almost equal to the original waveform (input to the second sampling circuit denoted by the reference numeral 305) is obtained before the second sampling, and the data after the second sampling is to be transmitted to a remote control signal reproduction side through a communication path (e.g., the remote control pass-through function of prior art).

At this point, if the data falls outside the band of the allowable range of the communication path, the data transmission cannot be performed, resulting in failure of reproduction of a remote control signal. However, if the data amount is far too little, i.e., sampling is too coarse, there will be no use for the data transmission. The sampling theorem may be used for the upper limit, since a coarser sampling than the sampling theorem may cause failure of recovery of the original data.

In conclusion, the sampling frequency 2 should be decided in consideration of the frequency of original remote control signal data (input data signal), the storage amount after the second sampling or the band of the communication path if required, and the required similarity to the original data.

In this example, the sampling frequency 2 is ¼ of the sampling frequency 1. By thus deciding the frequency 2 by dividing the sampling frequency by an integer, it is possible to easily use the data (see the reference numeral 106) quantized by the sampling frequency 1. Otherwise, the second sampling may also be carried out by converting the foregoing quantized data again into continuous data, and then sampling the converted data with an arbitrary frequency (other frequency than that equal to the sampling frequency 1 divided by an integer).

The reference numeral 107 of FIG. 1 is a result of quantization of the data denoted by the reference numeral 106 by the sampling frequency 2, that is ¼ of the sampling frequency 1. With this frequency equal to the sampling frequency 1 divided by an integer, the second sampling may be easily carried out by leaving 1 in 4 of the quantized data. In the reference numeral 107 of FIG. 1, the sampling result is expressed as either "H" level or "L" level; and "-" between the respective sampling results denotes continuity of result of one of the samplings until the next sampling.

The reference numeral 108 of FIG. 1 is a waveform resulting from recovery of the quantized data (reference numeral 107), that had been obtained by the second sampling. As can be seen in comparison with the recovery result denoted by the reference numeral 102, the waveform denoted by the reference numeral 108 is significantly close to the originally-intended waveform (reference numeral 100). The recovery accuracy depends on the sampling frequency 1 and the sampling frequency 2, and therefore, the resulting waveform may be notably easily changed to be further closer to the original waveform or one containing less data amount, by appropriately adjusting these sampling frequencies 1 and 2.

The following explains an example of adjustment method for the sampling frequency 1 and the sampling frequency 2. The example here is based on the structure shown in FIG. 8 (described later). Since the structure of FIG. 8 requires less storage area than that of FIG. 4, the circuit scale may be reduced, thus offering a certain advantage. The structure based on FIG. 4 requires [O(n)] D flip-flops corresponding to the number of bits to be corrected; on the other hand, the structure of FIG. 8 requires only [O(log n)] counters, thereby surely reducing the circuit scale.

The first sampling: a high-speed frequency is used. The frequency may be obtained by roughly dividing the system clock of the whole circuit for integrating the block including the other functions.

Figure 8:
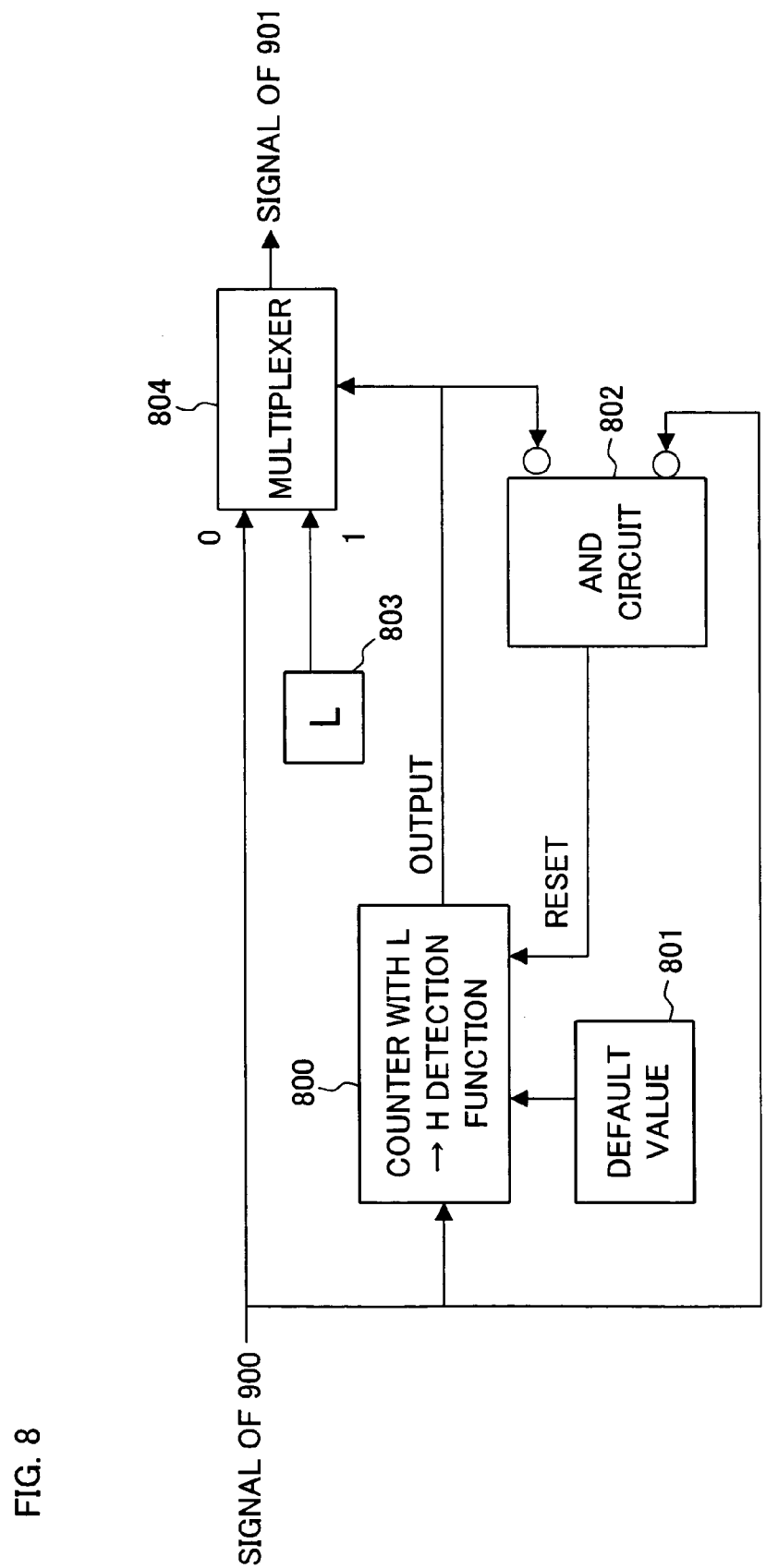
FIG. 8 is a circuit diagram illustrating a structure example of the main part of another remote control signal reception circuit according to the present invention.

This is because, in the structure of FIG. 8, a slight increase of the correction amount does not significantly increase the number of flip-flops as explained above (for example, correction up to 256 can be performed by a 8 bit counter), and therefore an increase of correction amount (=increase in speed in the first sampling) does not need to be taken into account. Further, if the data is reduced too much at the first stage, it cannot be recovered even when data shortage occurs during the reproduction process. For example, the sampling may be carried out with a sampling frequency 1 that is equal to the system clock divided by a predetermined ratio, or with a variable frequency of integer multiples (lower frequencies) thereof.

Correction amount: A correction amount setting register is provided. The register is capable of setting the correction amount in a predetermined range (for example, 0-255). The first sampling is performed at a speed as high as possible, and the measured delay time 104 is divided by the period of the first sampling. If the resulting value falls outside the range of correction amount setting register (not shown), the frequency for the first sampling is reduced. In this manner, correction may be more accurately performed. Note that, when the first sampling frequency is fixed, the correction amount needs to be measured in advance, with corresponding setting.

The second sampling: To realize a similar function to the remote control pass-through function, the same remote control signal as the remote control signal operated in the image receiving side needs to be reproduced in the image transmission side. Between the devices, an electric wave is used to allow transmission of the remote control signal in the opposite direction into the gaps of the image. The band of the signal is of course determined to some extent (to transmit the image, and not to cause any delay), and therefore, transmission of the remote control signal cannot be performed with limitless amount of data. When the desired band width (data transmission speed (data rate): bps) is determined, the data is preferably omitted in the second sampling to be a slightly smaller than the band width.

The second sampling frequency and the first sampling frequency may be separately set; however, there are no benefits in the actual setting to decide these frequencies as no-related values, and therefore, in terms of the simplification of the circuit, it is preferable that the second sampling is easily performed by picking up one in several correction results.

In the foregoing manner, the sampling frequency 2 is decided by dividing the frequency of the first sampling frequency by a specific integer so that the transmission is performed at a desired speed. If the band is sufficiently wide, high-compression is not necessary, thereby transmitting fine data.

Note that, if the remote control signal itself has a high-speed data rate with a large amount of information, excessive reduction of data according to the band at this stage results in failure of reproduction.

Incidentally, if only wishing to receive an infrared remote control signal and process the signal in the reception machine, either of the one denoted by the reference numeral 106 having been through error correction, or the one denoted by the reference numeral 107 having been through data amount reduction is used. Then, the following describes the case of using those for the foregoing remote control pass-through function.

It is assumed that a remote control signal is received in an image reception machine, and the quantized data denoted by the reference numeral 107 is obtained by the foregoing method. The data is also suitable to realize reduction of transmission data amount. Then, the following explains how to actually use the data in the image transmission machine.

Firstly, after reception of the quantized data denoted by the reference numeral 107, the control signal denoted by the reference numeral 108 is produced. Then, AND calculation is performed with respect to the control signal and an infrared carrier (not shown; generated in the transmission side of the remote control pass-through block) of, for example 38 kHz, so that the waveform denoted by the reference numeral 109 is obtained. This waveform is significantly similar to the original waveform (the waveform of the infrared pulse 100 transmitted from the remote control machine). The effect of the present invention can be seen in this waveform.

Further, for reference, AND calculation is performed using the data denoted by the reference numeral 102 as a control signal and an infrared carrier, as with the conventional method, and the waveform denoted by the reference numeral 110 is obtained. In comparison with the original waveform (waveform denoted by the reference numeral 100), the backend section of the "H" level is extended.

When the image transmission machine transmits the signal denoted by the reference numeral 109 to an image-transmitting device, such as a VCR, there will be a little possibility for malfunction, or failure in operation, as the waveform is very similar to the waveform denoted by the reference numeral 100. On the other hand, when the signal denoted by the reference numeral 110 is transmitted to an image-transmitting device, such as a VCR, there will be a high possibility for failure in operation depending on the condition such as the type of the remote controller, as the waveform includes error of one-stage extra than the amount estimated in the image transmission side.

Further, according to FIG. 1, the signal denoted by the reference numeral 108 (control signal) includes a slight amount of error compared to the original waveform (the waveform of the infrared pulse 100 transmitted from the remote control machine). The error results from the sampling periods of quantization of the data denoted by the reference numeral 105 and/or the reference numeral 107. More precise quantization may be performed by increasing the sampling frequency; however, it causes an increase in data amount or process time. In this view, these sampling periods should be determined in consideration of signal speed, characteristic of infrared unit, and/or allowable data amount for remote control signal transmission.

It should be noted that, when the infrared unit causes only a little delay, the first sampling has to be performed with a high sampling frequency in order to properly perform the subsequent correction. Further, when the remote control signal has a slow data rate, the time: (the first sampling ×the second sampling) may be set to a long length. This is because, if the sampling is performed in a higher frequency, the resulting information will be the same.

FIG. 3 shows an arrangement example of a remote control signal reception circuit according to the present invention. As shown in the figure, in the remote control signal reception circuit of the present invention, an infrared pulse (100 of FIG. 1) is first supplied to a demodulation section 300. The demodulation section 300 is quite common for an infrared remote control reception device, and is made up of a diode 500, a capacitor 501, a resister 502, a hysteresis comparator 503 etc., for example. Through the hysteresis comparator 503, the signal 101 of FIG. 1 is converted to the digital signal 102.

An output signal of the demodulation section 300 is transmitted to the first sampling circuit 301, so as to produce quantized data denoted by the reference numeral 105 in FIG. 1. When the sampling is performed using a sampling period (sampling frequency) other than the prearranged period, the circuit may include the first period setting section 302 to allow external setting of the sampling period.

The quantized data is then transmitted to the correction section 303 where conversion from "H" level to "L" level is performed, resulting in the data denoted by the reference numeral 106. If wishing to carry out correction using a difference correction amount than the prearranged one, the circuit may include the correction amount setting section 304 to allow external setting of the value.

The corrected quantized data is then transmitted to the second sampling circuit 305 to be subjected to the second sampling that reduces data amount as shown by reference numeral 107. The second period setting section in FIG. 3 is optional, to be used for make a change of the period according to circumstances.

For example, if the transmission of a remote control signal, as with the one performed in the remote control pass-through function, is not required, and only reception of a remote control signal is performed; such reduction of data amount may not be necessary. In this case, by using the output of the correction section 303 as the quantization data, more accurate remote control signal in terms of "H" level can be transmitted to the decoder, compared to the conventional circuit that uses the output of the demodulation section 300. More specifically, the present invention is not limited in use for the remote control pass-through function but may also be effectively adopted for a general conventional remote control signal reception.

Here, the following explains an order of data processing in the foregoing remote control signal reception circuit. The remote control signal reception circuit of the present invention offers a waveform significantly similar to that of the original signal; and further, the respective sections may be operated in parallel, thus offering reduction of memory consumption. This characteristic is explained in the following.

The demodulation section 300 is continuously driven since the timing of reception of the remote control signal is generally unpredictable. Accordingly, the output signal of the demodulation section 300 is continuously outputted, and the sampling of the first sampling circuit 301 is also continuously performed.

The correction section 303 only stores: (correction amount set by the correction amount setting section 304+1) bit. This information enables detection of changes from 1(high-level) to 0 (low-level), while also allowing correction of the sampling result of the first sampling circuit 301.

Accordingly, it is possible to significantly reduce the number of stages of FIFO (First-In First-Out memory) required for the correction, thereby miniaturizing the circuit scale when the structure is implemented by hardware, and miniaturizing the data storage memory when implemented by software.

The foregoing example is constituted as a circuit implemented by hardware; however, the respective processes after the demodulation section 300 may also be enforced by software. In this case, each section corresponds to a step performed by the software.

Figure 2:
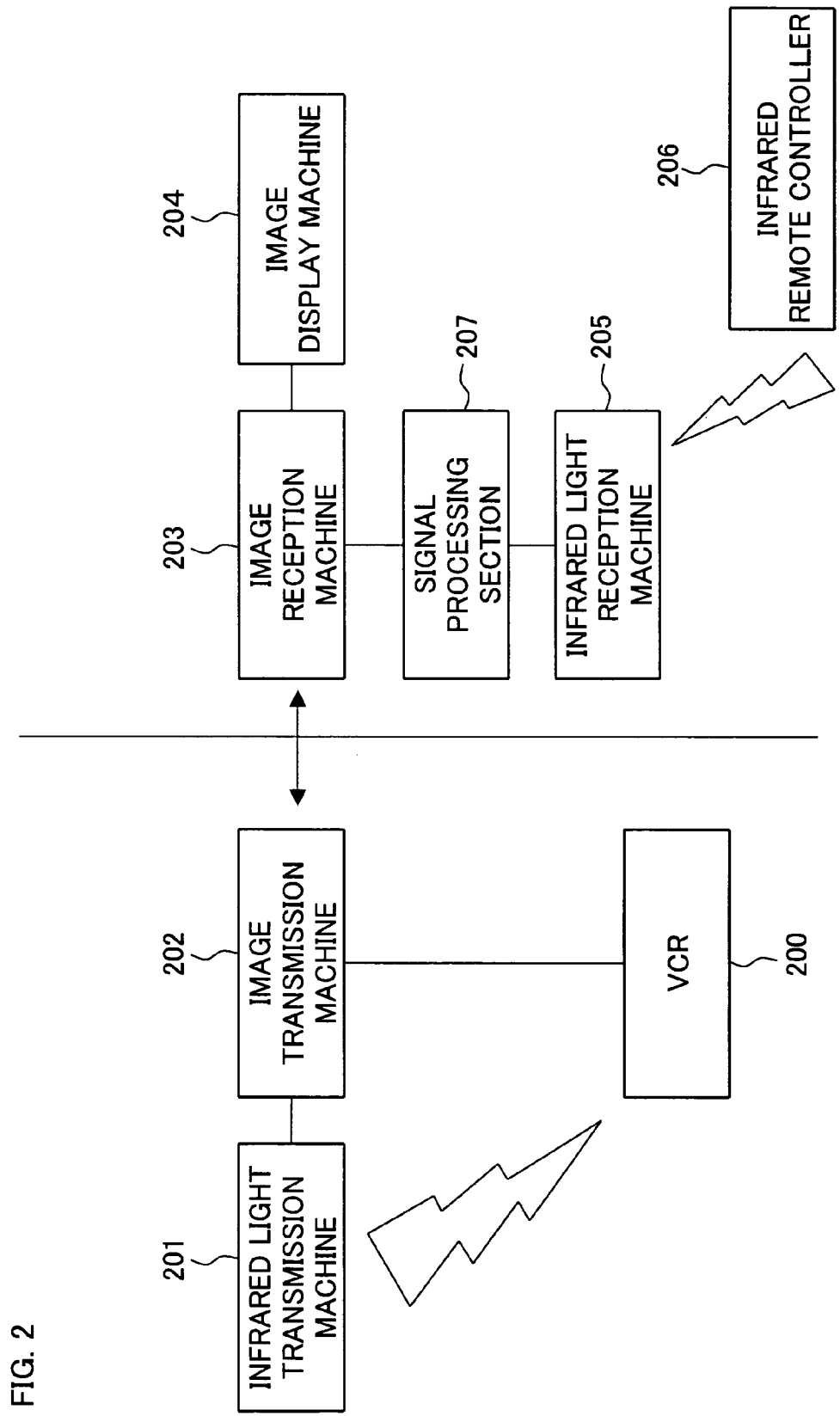
FIG. 2 is a block diagram illustrating a structure example of an image system having a remote control pass-through function.

FIG. 2 shows a structure example of a video system having the remote control pass-through function. In this example, a VCR is used as an image provider (image source). The VCR 200 is connected to an image transmission machine 202 to enable transmission of data to the image transmission machine 202. Further, the image transmission machine 202 is connected to an infrared light transmission machine 201, that transmits an infrared pulse to the VCR 200 in response to a signal sent from the image transmission machine 202.

In the meantime, the system also has a reception side though the location is not specified. An image reception machine 203 and an image transmission machine 202 are connected via a kind of medium, such as optical fiber, electric cable, or wireless medium, enabling transmission of images. The foregoing example uses a 2.4 GHz electric wave as the medium, that allows installation of the machines in separate rooms etc. Since an infrared light has a highly translatory characteristic, direct operation of the VCR 200 by the infrared remote control 206 cannot be carried out if there is a wall therebetween.

The image reception machine 203 and the image display machine 204 are connected to each other. The image display machine may be a TV, a liquid crystal panel or the like. The image reception machine 203 is further connected to the infrared light reception machine 205 via the signal processing section 207, allowing reception of an infrared signal from the infrared remote control 206. The image reception section 203, the signal processing section 207, and the infrared reception machine 205 may be provided separately or in combination. The signal processing section 207 corresponds to the part described in the present invention.

Here, the following describes how the infrared signal is transmitted to the VCR 200 from the infrared remote control 206. When a user watching the image display device 204, that may be a TV, desires to give some kind of instruction to the VCR 200, he/she operates the infrared remote control 206. The sent signal is received by the infrared light reception section 205, processed in the signal processing section 207, and received in the image reception machine 203. If the signal is not subjected to a particular process in the signal processing section 207, it includes an error (difference between the infrared remote control and the signal) generated in the infrared light reception machine 205, and is transmitted to the image reception machine 203 with the error. However, by processing the signal with the foregoing method and/or the circuit of the present invention, the error can be minimized.

The output signal of the image reception machine 203 is sent out to the image transmission machine 202, and is further sent out to the VCR 200 as an infrared signal via the infrared light transmission machine 201. As a result, the desired operation is performed according to the instruction. If the infrared light transmitted from the infrared light transmission machine 201 is similar to the signal of the infrared remote control 206, the VCR will be properly operated; however, if an error is generated in the infrared light reception machine 205, the signal from the infrared light transmission machine 201 includes an error, that increases the error amount to a degree uncorrectable by the VCR 200, resulting in malfunction of the VCR 200.

Here, the following describes an example of a circuit structure of the first sampling circuit 301 and the correction section 303.

Figure 4:
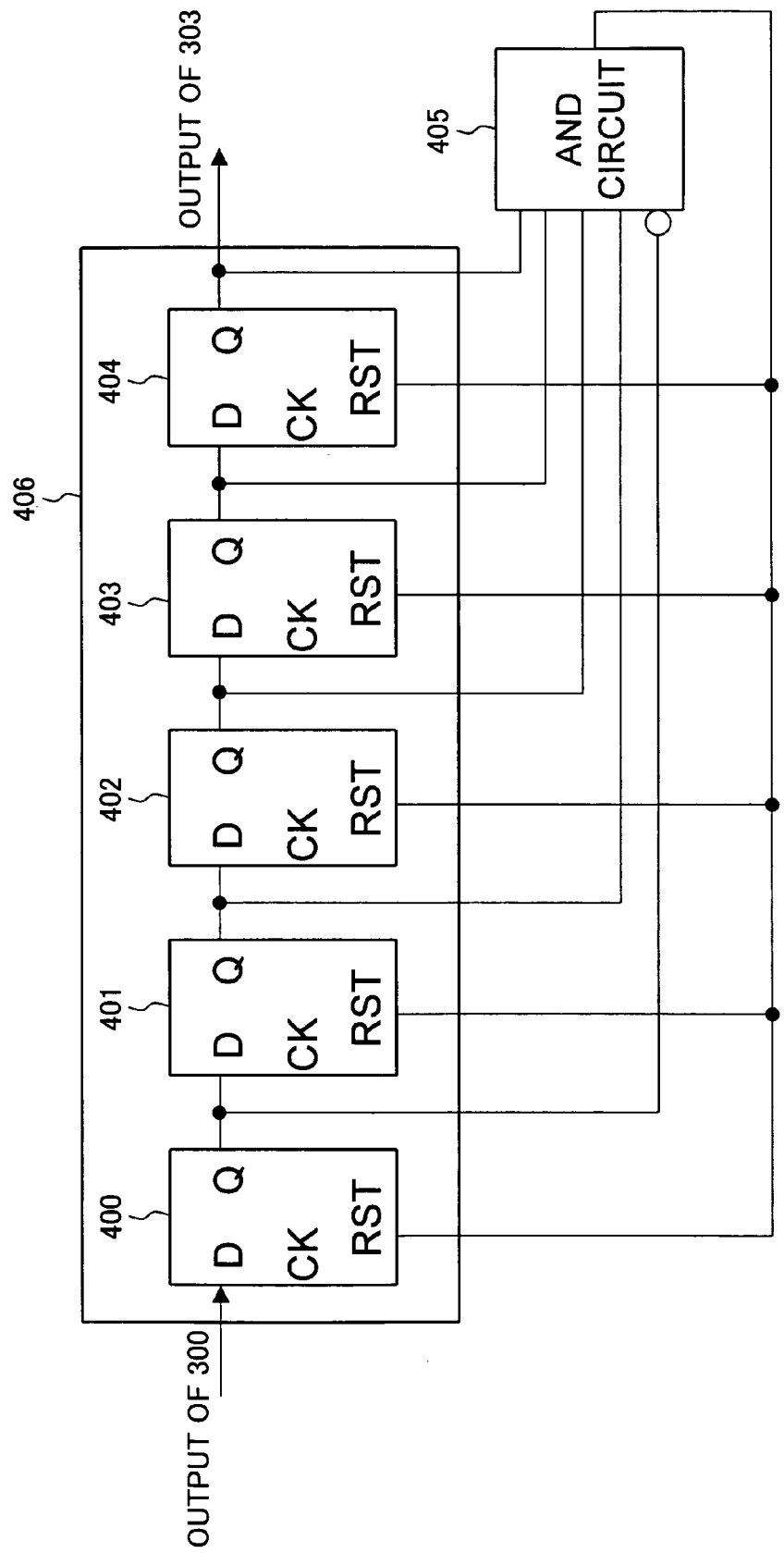
FIG. 4 is a circuit diagram illustrating a structure example of a sampling circuit and a correction section of the remote control signal reception circuit.

FIG. 4 is a circuit diagram illustrating a structure example of the first sampling circuit 301 and the correction section 303. The output signal from the demodulation section 300 (see FIG. 3), i.e., the signal denoted by the reference numeral 102 of FIG. 1 is supplied to an edge-triggered flip-flop (hereinafter simply referred to as a flip-flop) 400.

Though they are omitted in the figure for simplicity, each of the edge-triggered flip-flops 400 through 404 is supplied with a clock signal at frequencies according to the sampling frequency 1 via a CK terminal (clock input terminal). The signal (infrared pulse) denoted by the reference numeral 100 is sampled in synchronism with the clock signal, and the resulting value is kept (stored) in the corresponding flip-flop. As can be seen in FIG. 4, the flip-flops 400 through 404 are constituted as a FIFO (reference numeral 406). As explained, the flip-flops 400 through 404 function as storing means.

Further, this example uses a five-stages FIFO, that is used for a structure not including the correction amount setting section 304 and the correction amount is previously set to 4 (accordingly the FIFO has five-stages (4+1)).

Further, if the correction amount setting section 304 is provided, the FIFO is formed with a required number of extra stages and is provided with a bypass for supplying the output signal of the correction section 303 from the output terminal Q of an intermediate flip-flop, with the use of output selection signals corresponding to the respective stages of the FIFO and redesigned input paths to the AND circuit. With this arrangement, it is possible to realize the function of the correction amount setting section 304. This structure will be described later. Further, in the foregoing structure, each clock signal is supplied to the CK terminal of the flip-flop, and by allowing arbitrary setting of the first sampling period 1, it functions as the first period setting section 302.

Generally, the respective data is continuously outputted without modification from the output terminal Q of the flip-flop 404 in synchronism with the clock signal. However, when the output terminal Q of the flip-flop 400 becomes "L" level, and each output terminal Q of the flip-flops 401 through 404 all become "H" level, the output of the AND circuit 405 becomes "H" level, which asserts the a reset terminal RST of each flip-flops, thereby resetting the all flip-flops. This means enforcement of correction operation of the four preceding sampling periods from "H" level to "L" level when the signal denoted by the reference numeral 102 becomes "L" level. In this way, the present embodiment realizes the foregoing correction operation with a very simple circuit structure.

Figure 10:
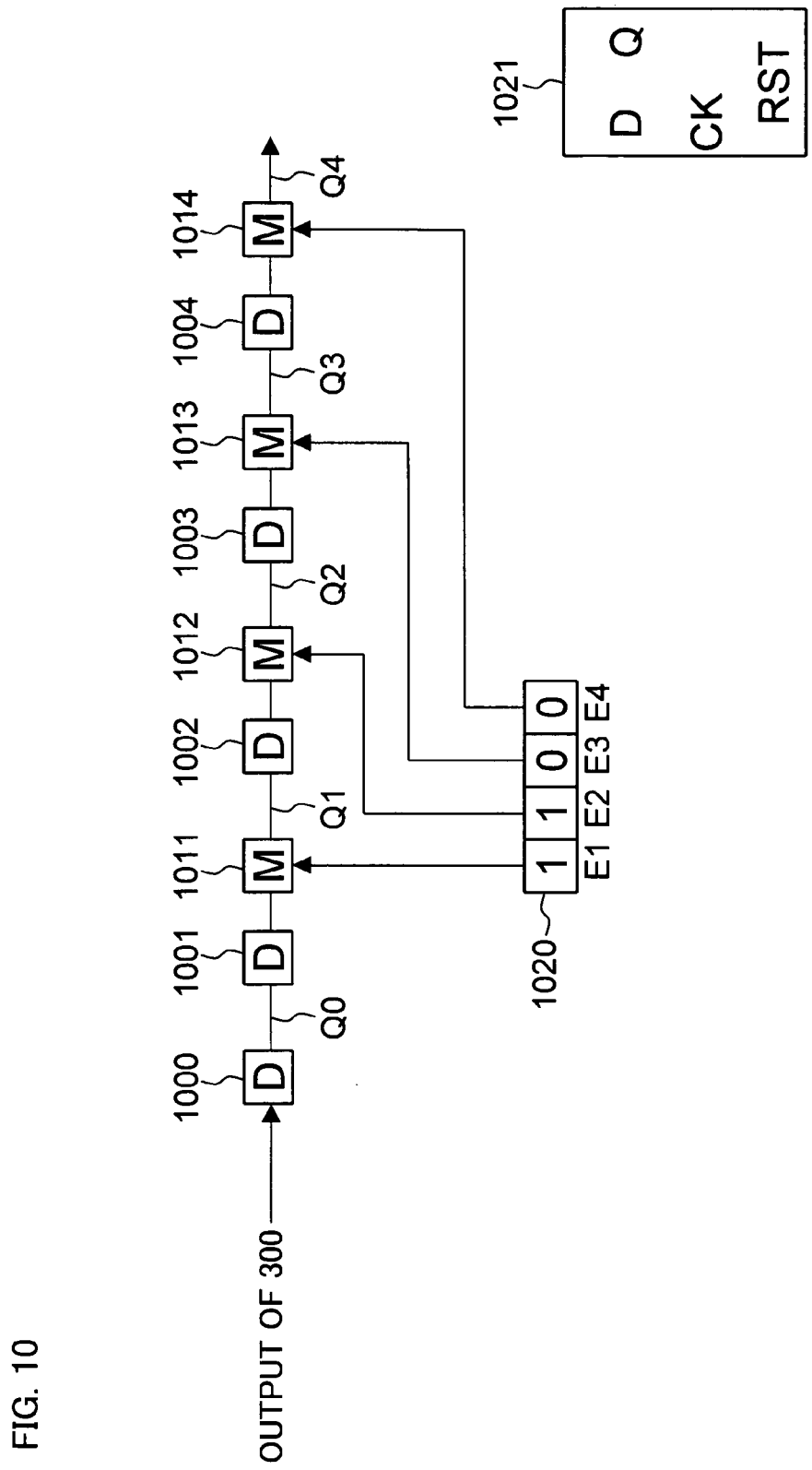
FIG. 10 is a circuit diagram illustrating another structure example of the sampling circuit and the correction section of the remote control signal reception circuit.

Here, the following shows a structure example of the correction amount setting section 304. The circuit shown in FIG. 4 is modified to the one shown in FIG. 10. In FIG. 10, the reference numerals 1000 through 1004 (denoted by D in the figure) are D flip-flops (edge-triggered flip-flop), each of which has an arrangement shown in the reference numeral 1021.

Further, the reference numerals 1011 through 1014 (denoted by M in the figure) are multiplexers, each of which outputs an input signal without correction when the selection signal E is "H" level, and outputs "H" level when the selection signal E is "L" level. Further, each of the selection signal input terminals of the multiplexer 1011 through 1014 is connected to a corresponding predetermined bit of the correction amount setting resister 1020.

FIG. 10 is a structure example having a correction section with a correction amount $\leqq 4$. For example, when the correction amount is set to 2, the correction amount setting register 1020 sets E1 and E2 to 1, and sets E3 and E4 to 0. In the example of FIG. 10, the correction amount is set to 2.

Note that, when the correction amount is set to 1, only E1 is set to 1 and all the other are set to 0. Further, when the correction amount is set to 4, all of the E1 through E4 are set to 1. More specifically, if assuming the correction amount is n, the resister is arranged so that a bit at or lower than the predetermined bit En is set to 1, and a bit greater than En is set to 0. With this arrangement, the circuit can be easily enlarged for a correction amount greater than 4.

The multiplexer 1011 through 1014 each have an output terminal Mout, that are referred to as Q1 through Q4, respectively. Further, the output terminal of the first-stage D flip-flop 1000 is referred to as Q0. Further, the clock signals supplied to the D flip-flops are all the same, and carry out the first sampling at allowable set periods, or at fixed periods. Further, each of the reset terminals RST of the D flip-flops are supplied with a common signal expressed as: RST=(not Q0) & Q1 & Q2 & Q3 & Q4. Note that, in the RST, "not" indicates an inversion signal of the output signal of the subsequent terminal, and "&" indicates AND calculation.

The output signal OUT having been modified is expressed as: OUT=S0 & Q0+S1 & Q1+S2 & Q2+S3 & Q3+S4 & Q4. Further, S0 through S4 are respectively expressed as: S0=(not E1) & (not E2) & (not E3) & (not E4), S1=E1 & (not E2) & (not E3) & (not E4), S2=E1 & E2 & (not E3) & (not E4), S3=E1 & E2 & E3 & (not E4), and S4=E1 & E2 & E3 & E4. Note that, In Out and S0 through S4, "&" indicates AND calculation and "not" indicates an inversion in level of the subsequent bit.

More specifically, n of Sn indicates a correction amount, and if the correction amount setting section 1020 has the foregoing arrangement, one of the Sn (S0-S4) s becomes 1, and the rest of those become 0. As a result, OUT becomes Qn with n as a corresponding correction amount, and is outputted from a desired intermediate point (a desired-stage of multiplexer).

Here, the following minutely describes the example of FIG. 10. The operation of this example is basically the same as that of FIG. 4; however, since the values of Q3 and Q4 are always 1 due to the operation of the multiplexers, they do not contribute generation of RST signal.

Accordingly, the D flip-flops are reset in response to condition that: Q0=0 and Q1=Q2=1. Here, among the Sn of output OUT, only S2 becomes 1, and Q2 becomes OUT. This condition continues unless the value of the correction amount setting register 1020 is changed, and therefore the value of Q2 is outputted again and again. The signals of Q3 and Q4 may be changed to "L" level by RST,; however, these results can be removed. Further, since S0 and S1 are 0, the values of Q0 and Q1 do not affect the result of OUT.

This is merely one of the implementation ways, and the setting of correction amount may be carried out by the other method. Further, this example describes the case where the correction amount $\leqq 4$: however, the structure may be easily enlarged for a correction amount equal to or greater than 5.

Further, by carrying out sampling by flip-flops with respect to, for example 1 in 2 of the signals outputted from the correction section 303, i.e., at doubled periods of that given to the CK terminal, and reading out the sampling results from a register by the CPU if required, the second sampling circuit 305 can also be easily realized. In this example, a doubled period is used for ease of explanation; however, the present invention is not limited to this method and the period is obviously modifiable, thus also realizing the second period setting section 306. Further, this circuit example is one of the possible structures, and the circuit may have a different structure as long as it achieves the same effect.

Figure 5:
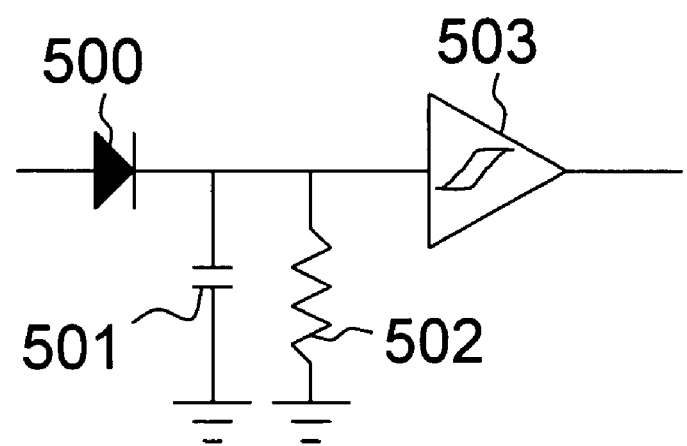
FIG. 5 is a circuit diagram illustrating a structure example of a demodulation section of the remote control signal reception circuit.

FIG. 5 is an example of circuit structure for the demodulation section 300. The inputted infrared signal (see the reference numeral 100 of FIG. 1) passes through the diode 500, and then smoothed by the capacitor 501 and the resistor 502, resulting in the waveform denoted by the reference numeral 101. Thereafter, the signal passes through the hysteresis comparator 503, resulting in the digital signal denoted by the reference numeral 102 of FIG. 1.

Figure 6:
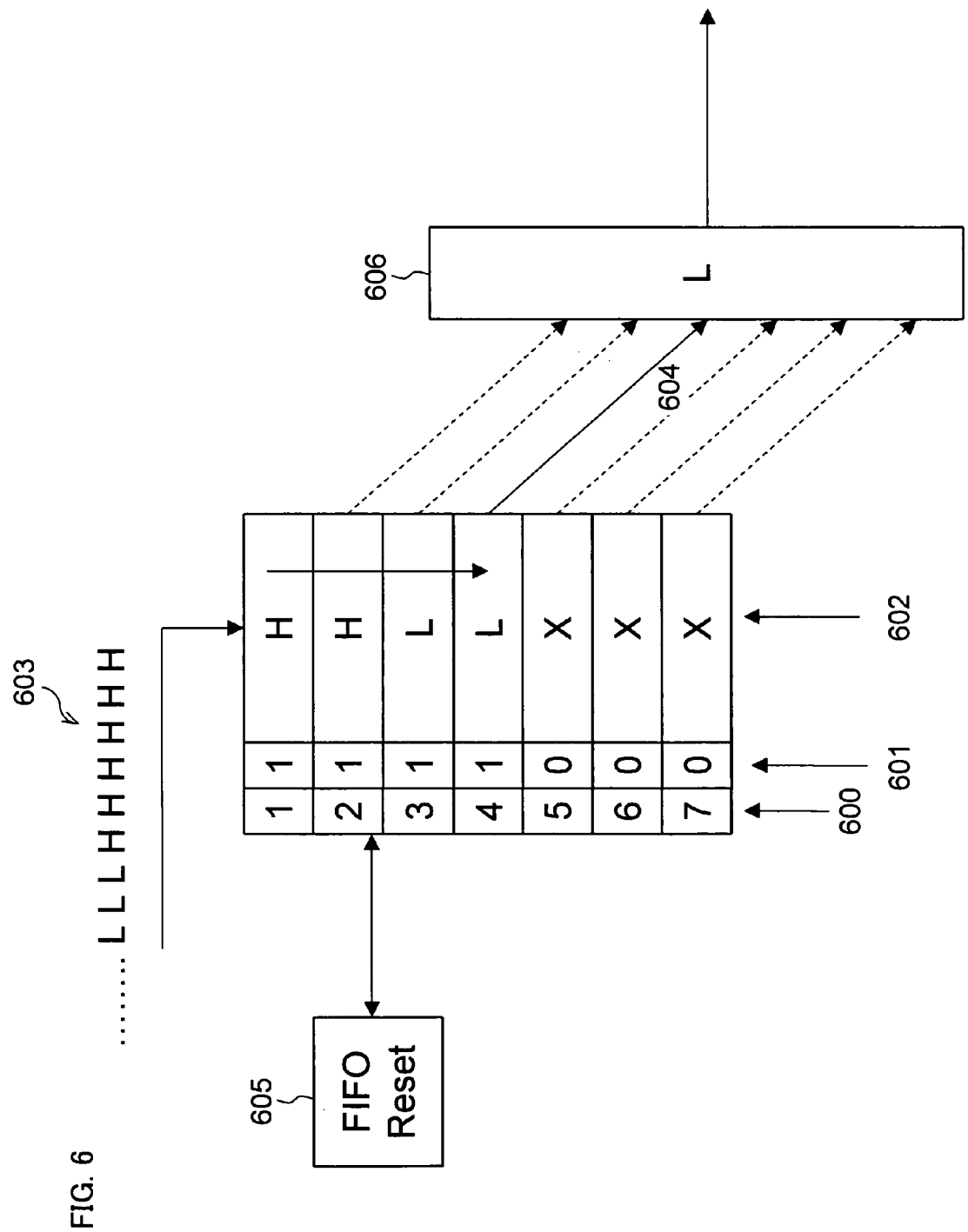
FIG. 6 is an explanatory view of the concept of FIG. 4.

FIG. 6 explains the concept of FIG. 4. The reference numerals 600, 601 and 602 constitute a FIFO with a variable number of stages. Each number in the reference numeral 600 is a number for identifying the respective stages. The data is first goes into the first-stage, and then sequentially moves to the next stage as the next data is supplied. The reference numeral 601 denotes an enable signal of each stage of the FIFO in which 1 indicates "enable" and 0 indicates "disable". In this example, the first stage through fourth stages are "enable".

FIG. 6 shows a case with a correction amount from "H" level to "L" level is set to 3, and therefore four-stages of FIFO are enabled. Enabling four-stages means enabling (1) all of the first through fourth-stages and disabling (0) the remaining stages, and does not mean any four of the seven stages can be enabled; in other words, the case where 0 and 1 are mixed in the first through fourth-stages should be excluded regardless it is intended or not. The reference numeral 602 is input data of the FIFO, with the levels "L", "L", "H", and "H" respectively, in order of earlier to later input.

Further, as denoted by the reference numeral 603, in response to the sampling frequency 1, i.e., in response to input of the clock signal into the FIFO, all data is shifted. The FIFO may be regarded a shift register in this sense.

The reference numerals 604 and 601 together indicate output path from a part of the FIFO. By providing some extra stages to allow determination (setting) of the stage number from an external circuit, the correction amount may be set to an arbitrary value. In the example of FIG. 6, the reference numeral 604 is lead from the fourth-stage from which the data is output in a sequential manner. As explained above, the immediately preceding data is stored in the storing means 600, allowing selection between using the data without correction or using an elite quantized data by extracting 1 data in several numbers with the second sampling frequency 2. The reference numeral 606 is only connected to the output path of the final enabled stage, denoted by the reference numeral 604 (the output paths denoted by the broken lines in FIG. 6 are not connected to 606). The reference numeral 605 is a resetting section for the FIFO.

The resetting here means setting "L" for all data fields of the reference numeral 602. The condition is determined according to the data of the reference numeral 602 and the FIFO is reset. This condition is the same as that of the AND circuit 405, that is, only the first stage is "L" level and the remaining stages are "H" levels.

The example shown in FIGS. 4 and 6 is one implementation structure using a shift register; however, it may also be implemented by using a counter circuit or the like. For example, the correction amount is previously stored (preset) in the counter, and in response to the detection of a change from "L" level to "H" level in the sampling of 105, the output data is set to "L" level until the counter turns to 0 (corresponding to the reference numeral 106). When the counter says 0, the counter is reset again by the correction amount, and the input value is outputted without correction. In this manner, the memory amount for storing data may be reduced regardless of the correction amount.

Figure 9:
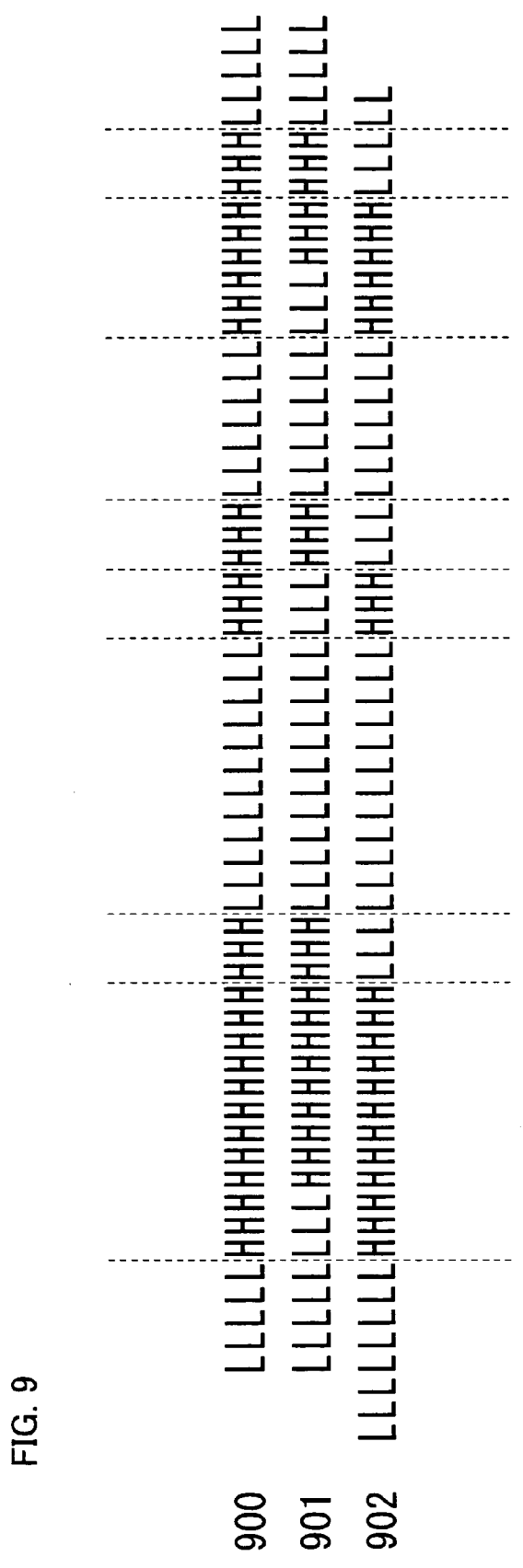

FIG. 9 shows an example using such a counter. The reference numeral 900 of FIG. 9 corresponds to the input signal denoted by the reference numeral 105 of FIG. 1. The reference numeral 901 denotes a result of correction operation where the correction amount=3, in which the "H" level is modified to "L" level in response to the detection of a change from "L" level to "H" level. This modification from "H" level to "L" level is carried out for the numbers corresponding to the correction amount, counted from the detection. When one correction operation is done, the counter is reset to the predetermined correction amount (3 in this case). The data of the reference numeral 901 denotes a state when the correction operation is repeatedly carried out. In the reference numeral 902 of FIG. 9, the data of 901 is shifted to the left for the correction amount, for ease of explanation. As can bee seen in the figure, the originally-intended effect of cutting off the back end portion of the "H" level is realized.

FIG. 8 shows an example of a circuit for carrying out the correction operation of FIG. 9. In the structure of FIG. 8, the correction section 303 and the correction amount setting section 304 of FIG. 3 are implemented by the counter 800.

As shown in FIG. 8, the quantized data is supplied to one input terminal of the multiplexer 804 and "L" level is supplied to the other input terminal. Generally, the quantized data is outputted from the multiplexer 804. Then, in response to detection of a change of the quantized data from "L" level to "H" level, the counter 800 starts the counting, and 1 ("H" level) is outputted during the counting. In this case, the multiplexer 804 outputs "L" level.

Further, the counter 800 includes a default value register 801, that can be preset by a predetermined value or an external value. The counter 800 further includes a reset input terminal. The reset input terminal is supplied with an output signal of the AND circuit 802. When the quantized data is changed from the "H" level to "L" level, and "L" level output signal of the counter 800 is supplied to the AND circuit 802, the reset input is activated, thereby resetting the counter 800.

Here, the following minutely describes the operation of the counter 800. During the period where the quantized data (input signal) is "L" level, the multiplexer 804 outputs the signal same as the input signal, i.e., a "μL" level signal. When the quantized data is changed from the "L" level to "H" level, the counter 800 outputs 1 ("H" level) during the descent-counting. Consequently, the whole output of the block (output of the multiplexer 804) becomes "L" level.

Upon input of the quantized data in an amount corresponding to the preset correction amount (default value), the counter 800 starts counting down, and finally outputs 0 ("L" level). Here, the multiplexer 804 outputs the foregoing quantized data without correction, i.e., as "H" level in this example. At this point, the condition for activating the AND circuit 802 is not yet all set; however, when the quantized data is changed from "H" level to "L" level, the output signal of the AND circuit 802, i.e., the reset terminal of the counter 800 is activated, thereby resetting the counter 800. Thereafter, the condition is back in the initial state until another change of the quantized data from the "L" level to "H" level occurs. By repeatedly carrying out these sequences of operation, the correction section 303 can be easily realized.

Figure 7:
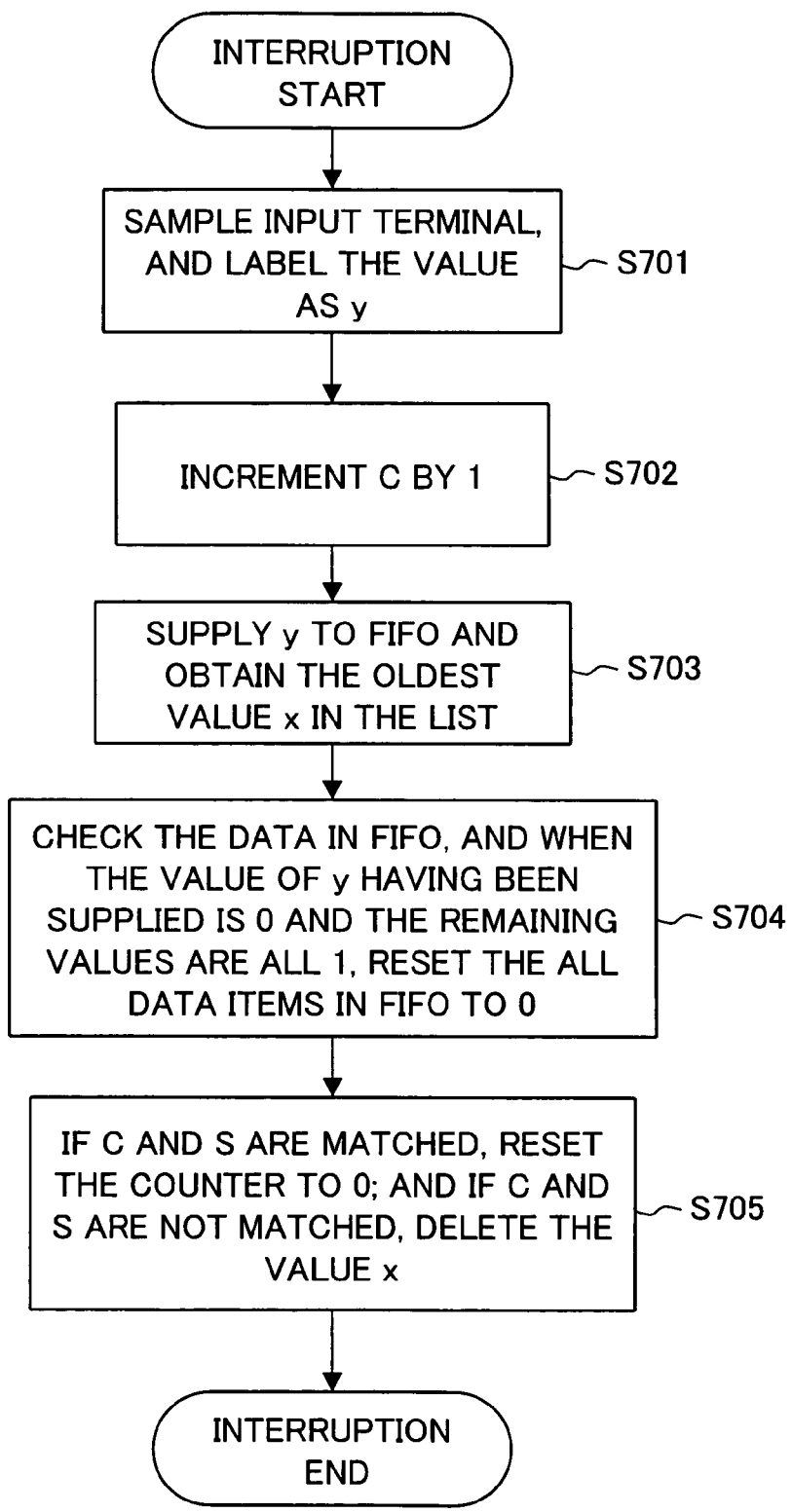
FIG. 7 is a flow chart for an enforcement of the present invention as a program.

FIG. 7 shows a flow chart of a program as an implementation of the present invention. A possible example of the implementation method may be a method of enforcing the program after the first sampling is done in the main program, or a method of enforcing the program as an interrupt routine. In this example of FIG. 7, interruption signal is separately produced by a timer or the like in a regular and continuous manner at the periods of the first sampling. Then, the program (interrupt processing routine) is enforced by the interruption signal. The example of the routine is described below.

Further, the input is supplied via an input terminal (with a waveform as with the one denoted by the reference numeral 102 of FIG. 1) that enables acquisition of the output result of FIG. 5. The amount of correction from "H" level to "L" level is already given before the enforcement of the program as a correction amount M, that is expressed as the number of periods of the first sampling that is specified by the timer. Further, the program also has a function of the second sampling whose period is set as the amount S, that is a frequency for sampling the data (the number of data (period) to be skipped) in the period of the first sampling. These M and S are previously decided in the initial routine before the enforcement of the interrupt routine. Further, in the initialization routine, the counter C is reset to 0, and the data structure (size: correction amount M+1) of FIFO type for storing data is already initialized.

In the interrupt routine, firstly, the value of the input signal demodulated in the step 701 is sampled, and the "H" level is stored as 1, and the "L" level is stored as 0. This result is determined as y. Next, in the step 702, the counter c is incremented by 1. This counting is used for measurement of the second sampling period. As described above, the second sampling is performed at predetermined periods that are 1 in several periods of the first sampling. The counter c stores each of the foregoing sampling to judge the timing for the second sampling.

In the step 703, the value y obtained in the step 701 is supplied to the backmost of the FIFO, thus obtaining the value x from the top. As mentioned above, the number of stages of FIFO is equal to: correction amount+1. In the step 704, judgment is carried out as to whether or not: y=0, and the remaining FIFO data is 1. This judgment is to detect a change of the input signal from "H" level to "L" level.

If the condition is met, all FIFO data is cleared to 0. Here, the correction is completed. In the step 705, the value of the counter incremented in the step 702 is compared with the value S showing the timing for the second sampling. If these values are not matched, the value x is deleted. If they are matched, the data is passed on to the next processing section, while resetting the counter to 0. Note that, this explanation omits the next processing; however, the following can be assumed.

For example, in the image receiving machine denoted by the reference numeral 203 (see FIG. 2) used for the remote control pass-through function, the foregoing flow chart is performed in the signal processing section 207. After the correction is done, the resulting infrared remote control data is to be sent from the image receiving machine 203 to the image transmission machine 202; however, since the amount of data has been increased, it is not desirable to send the data as such. In this view, the rate is decreased to the degree enough for transmission of remote control signals to reduce the information amount in transmission, so that the data transmission is more easily carried out. Therefore, the sampling here is performed at a slower rate than that in the step 701 in terms of reduction of data.

The respective blocks of the remote control signal reception circuit may be constituted of a hardware logic, or may be realized by software with a CPU as follows.

Specifically, the remote control signal reception circuit of the present invention includes, for example, a CPU (Central Processing Unit) for enforcing instructions of the control program for realizing the respective functions, a ROM (Read Only Memory) for storing the program, a RAM (Random Access Memory) for developing the program, a storage device (storage medium) such as a memory for storing the program and the various data. Further, when the respective functions are realized as software, the program code (execute form program, intermediate code program, source program) of the remote control signal reception program is stored in a program medium readable by a computer, which medium is provided to the remote control signal reception circuit. In this way, the objective of the present invention may also be achieved by reading out (enforcing) the program code stored in the storage medium by the computer (or, by CPU, MPU).

The storage medium may be tape based, such as a magnetic tape or cassette tape; disc based, such as a magnetic dist like a floppy disc®, hard disk or an optical disc such as CD/MO/MD/DVD/CD-R; card based, such as an IC card (including a memory card), an optical card; or a semiconductor memory, such as a mask ROM, EPROM, EEPROM, and a flash ROM.

Further, the remote control reception circuit may be constituted to be connectable to a communication network, so as to allow provision of the program code via a communication network. The communication network is not particularly limited, and it may be: the Internet, Intranet, Extranet, LAN, ISDN, VAN, CATV communication network, virtual private network, telecommunication network, mobile body communication network, satellite communication network etc. Further, a transmission medium for constituting the communication network is not particularly limited, and it may be wired based, such as IEEE1394, USB, power-line carrier, cable TV line, telephone line, ADSL line, or radio based, such as infrared medium such as IrDA, remote control, Bluetooth, 802.11 radio, HDR, mobile phone network, satellite communication line, ground wave digital network. Note that, the present invention may be realized in the form of a carrier wave, or a data signal line that realize the program code by electronic transmission.

As described, the present invention performs sampling of an input signal using a sampling clock faster than the data speed of the input signal, and carries out quantization of the sampling result and temporary stores the quantization data. When the result indicates "L" level, the data is not necessary to be modified and is outputted as such; and when the result indicates "H" level, the change from "H" level to "L" level is detected, and the predetermined part immediately preceding the change is modified from "H" level to "L" level. The modified data is regarded the quantization data.

The duration to keep the quantization data depends on the correction amount and the sampling clock. When the correction amount is great, a temporary storage area or a counter for holding the data is obviously required. As described, the present invention allow a change of sampling frequency, or change of correction amount from "H" level to "L" level, or both of those. If the characteristic of the former-stage circuit is well-known, these values may be fixed according to the characteristic; however, modifiable setting allows flexible change according to a change of the former-stage circuit.

Further, the quantized data having been through the correction is not necessarily have to be held or outputted as such, but may be subjected to another sampling with the second sampling frequency, that is lower than the first sampling frequency and higher than the infrared remote control signal.

On this account, the data amount can be reduced compared to the case of outputting the data as such after the correction. Through the second sampling, the signal contains more error than the input signal; however, by appropriately setting the frequency required for remote control signal transmission, the second sampling is still advantageous. The second sampling frequency may also be set to not only a fixed value but also a modifiable value that can be changed externally. This arrangement offers superior flexibility.

By allowing setting of these three parameters, various signal transmission may be carried out with less amount of data or as digital transmission. The setting of these parameters may be performed as follows: the first sampling frequency is obtained by dividing the system clock; the correction amount is set to an integer multiple of the period of the first sampling; and the frequency of the second sampling is equal to the first sampling frequency divided by an integer. Such a setting of the parameters significantly simplifies the processes after the correction.

The foregoing method may be realized as a program enforced by a computer. In the enforcement of the foregoing method or the circuit, the detection of the period of "L" level may mistakenly pick up noise or the like having a shorter low-level period than the remote control signal. To avoid such defect, the method or the circuit may be arranged to have a function to recognize the low-level period shorter than a certain length. With this arrangement, such a period is ignored as noise, i.e., regarded as a part of the "H" level period. On this account, the method may be carried out without such a defect that a slight amount of noise increases to large noise. In a similar way, it is possible to exclude the high-level period shorter than the signal. The threshold values for these functions may be set as parameters so as to allow external setting, thereby offering superior flexibility.

As described, the present invention allows adjustment of "H" level period in a digital method. In this manner, even when transmission of data by an infrared reception signal results fails to propagate the data of the sending end, the defect can be corrected, allowing the later-stage decoders to receive the data closer to the originally-intended data.

Further, the present invention may be adopted for a device using a remote control signal relay function in which the remote control signal is transferred via a relay point to a device too distant to be operated by a remote controller. This usage is free from accumulation of error of the reception signal.

A remote control signal reception circuit of the present invention includes: first sampling means for sampling an input data signal to carry out quantization of said input data signal using a first sampling frequency that is higher than a frequency of said input data signal, and storing a result of the quantization in storing means; and correcting means for carrying out correction of said result of the quantization stored in said storing means according to each result, and outputting a result of the correction as quantization data.

It is preferable that, when said result of the quantization is low-level, the correcting means outputs a low-level as the quantization data, and when said result of the quantization is high-level, the correcting means detects a change from high-level to low-level, and modifies results of the quantization from high-level to low-level for a predetermined number of sampling periods of the first sampling means, which number is counted backward from the change from high-level to low-level, and then outputs a result of modification as the quantization data.

Another remote control signal reception circuit of the present invention includes: a sampling circuit including a plurality of flip-flops, connected to one another in a cascade manner, for sampling an input data signal using a first sampling frequency that is higher than a frequency of said input data signal, based on a clock signal having the first sampling frequency, and outputting an output signal of a final-stage flip-flop as quantization data; and an AND circuit for carrying out AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

Another remote control signal reception circuit of the present invention includes: first sampling means for sampling an input data signal to carry out quantization of said input data signal using a first sampling frequency that is higher than a frequency of said input data signal, and outputting a result of the quantization as quantization data; and correcting means for detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

It is preferable that the correcting means includes: a counter that is pre-settable and starts counting operation upon the change of the quantization data from high-level to low-level, and outputs high-levels during the counting operation and outputs a low-level when the counting operation is completed; a multiplexer supplied with the quantization data and low-levels, and outputs the low-levels during the counting operation by the counter and outputs the quantization data at all other times; and an AND circuit for carrying out AND calculation with respect to an output signal of the counter and the quantization data, and resetting the flip-flops when the counting operation is completed at the change of the quantization data from high-level to low-level.

The foregoing remote control signal reception circuit preferably further includes: first sampling frequency setting means for setting the first sampling frequency.

The foregoing remote control signal reception circuit preferably further includes: correction amount setting means for setting an amount of the correction performed by the correcting means.

The foregoing remote control signal reception circuit preferably further includes: second sampling means for carrying out sampling with respect to the quantization data outputted from the correcting means using a second sampling frequency that is higher than a frequency of said input data signal and lower than the first sampling frequency, and outputting a result of the sampling as the quantization data.

The foregoing remote control signal reception circuit preferably further includes: second sampling frequency setting means for setting the second sampling frequency.

The foregoing remote control signal reception circuit preferably further includes: sampling frequency producing means for producing the first sampling frequency by dividing a system clock.

In the foregoing remote control signal reception circuit, it is preferable that the second sampling frequency is equal to the first sampling frequency divided by an integer.

A remote control signal reception method of the present invention includes the steps of: (a) sampling an input data signal to carry out quantization of said input data signal using a first sampling frequency that is higher than a frequency of said input data signal, and storing a result of the quantization; and (b) carrying out correction of said result of the quantization that has been stored according to each result, and outputting a result of the correction as quantization data.

It is preferable that, in the foregoing step (b), when said result of the quantization is low-level, a low-level is outputted as the quantization data, and when said result of the quantization is high-level, a change from high-level to low-level is detected and results of the quantization are modified from high-level to low-level for a predetermined number of sampling periods of the first sampling means, which number is counted backward from the change from high-level to low-level, and a result of modification is outputted as the quantization data.

Another remote control signal reception method of the present invention includes the steps of: (a) carrying out sampling by a plurality of flip-flops, connected to one another in a cascade manner, with respect to an input data signal using a first sampling frequency that is higher than a frequency of said input data signal, based on a clock signal having the first sampling frequency, and outputting an output signal of a final-stage flip-flop as quantization data; and (b) carrying out an AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

Another remote control signal reception method of the present invention includes the steps of: (a) sampling an input data signal to carry out quantization of said input data signal using a first sampling frequency that is higher than a frequency of said input data signal, and outputting a result of the quantization as quantization data; and (b) detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

It is preferable that the foregoing step (b) includes the sub-steps of: (i) carrying out pre-settable counting operation that starts upon the change of the quantization data from high-level to low-level, and outputting high-levels during the counting operation and outputting a low-level when the counting operation is completed; (ii) carrying out multiplexing of the quantization data and low-levels that have been supplied, and outputting low-levels during the counting operation and outputting the quantization data in all other times; and (iii) carrying out AND calculation with respect to a result of the counting operation and the quantization data, and resetting the flip-flops when the counting operation is completed at the change of the quantization data from high-level to low-level.

The foregoing remote control signal reception method preferably allows setting of the first sampling frequency.

The foregoing remote control signal reception method preferably allows setting of an amount of the correction performed in the step (b).

The foregoing remote control signal reception method preferably further includes the step of: (c) carrying out second sampling with respect to the quantization data outputted through the step (b) using a second sampling frequency that is higher than a frequency of said input data signal and lower than the first sampling frequency, and outputting a result of the sampling as the quantization data.

The foregoing remote control signal reception method preferably allows setting of the second sampling frequency.

In the foregoing remote control signal reception method, it is preferable that the first sampling frequency is produced by dividing a system clock.

In the foregoing remote control signal reception method, it is preferable that the second sampling frequency is equal to the first sampling frequency divided by an integer.

A remote control signal reception program according to the present invention enforces one of the foregoing remote control signal reception circuits by causing a computer to function as the respective means or the circuit.

A computer-readable storage medium according to the present invention stores the foregoing remote control signal reception program.

As described, a remote control signal reception circuit according to the present invention includes: first sampling means; and correcting means for carrying out correction of said result of the quantization stored in said storing means according to each result, and outputting a result of the correction as quantization data.

According to this invention, the first sampling means samples the received input data signal to carry out quantization of said input data signal using a first sampling frequency, and stores the result of the quantization in storing means. Then, the correcting means carries out correction of the result of the quantization stored in the storing means, and outputs the result of the correction as quantization data.

Since the correction of the quantized data is carried out with reference to the result of quantization stored in the storing means, the correction is performed in a digital manner.

Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

It is preferable that, when said result of the quantization is low-level, the correcting means outputs a low-level as the quantization data, and when said result of the quantization is high-level, the correcting means detects a change from high-level to low-level, and modifies results of the quantization from high-level to low-level for a predetermined number of sampling periods of the first sampling means, which number is counted backward from the change from high-level to low-level, and then outputs a result of modification as the quantization data.

In this case, when said result of the quantization is low-level, the correcting means outputs a low-level without correction, and when said result of the quantization is high-level, the correcting means detects a change from high-level to low-level, and modifies results of the quantization from high-level to low-level for a predetermined number of sampling periods of the first sampling means, and then outputs a result of modification as the quantization data.

The foregoing remote control reception circuit preferably includes: a sampling circuit; and an AND circuit for carrying out AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

In this case, the respective flip-flops function as storage means, and sampling of the input data signal is carried out in synchronism with a clock signal with a first sampling frequency, and the quantization data is outputted from the final-stage flip-flop. Further, the AND circuit resets the respective flip-flops, and therefore, when the input data signal becomes low-level, the quantization data is corrected from high-level to low-level for the number=[number of flip-flops−1], which number is counted backward from the change in terms of sampling period. In this way, the same effect as above may be obtained with a significantly simple circuit structure.

As described, a remote control signal reception circuit according to the present invention includes: first sampling means; and correcting means for detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

According to this invention, the first sampling means samples the received input data signal to carry out quantization of the input data signal using a first sampling frequency, and outputs the result as quantization data. Upon detection of a change of the quantization data from low-level to high-level, the correcting means modifies a predetermined number of results of the quantization from high-level to low-level, which number is counted forward from the change from low-level to high-level in units of a sampling period of the first sampling means, and outputs a result of modification as the quantization data.

Since the correction of the quantized data is carried out with reference to the result of quantization, the correction is performed in a digital manner. Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

Besides, since the circuit does not require storing means for storing the quantized data regardless of the correction amount, it may be constituted as a simple structure.

It is preferable that the correcting means includes: a pre-settable counter; a multiplexer; and an AND circuit.

In this case, upon detection of a change from low-level to high-level, the counter starts counting operation, and the low-level is outputted from the multiplexer, i.e., the quantization data is modified from high-level to low-level until the counter is incremented to the pre-set value. When the counter reaches the pre-set value and the quantization data changes from high-level to low-level, the AND circuit resets the counter. With this arrangement using a counter, it is not necessary to provide storing means for storing the quantized data regardless of the correction amount, thereby greatly and securely simplifying the structure.

The foregoing remote control signal reception circuit preferably further includes first sampling frequency setting means for setting the first sampling frequency. With this arrangement, the first sampling frequency may be set externally, while allowing flexible change according to a change in specification of a circuit for supplying an input data signal.

The foregoing remote control signal reception circuit preferably further includes correction amount setting means for setting an amount of the correction performed by the correcting means. With this arrangement, the correction amount may be set externally, while allowing flexible change according to a change in specification of a circuit for supplying an input data signal.

The foregoing remote control signal reception circuit as set forth in claim 12, further comprising: second sampling means for carrying out sampling with respect to the quantization data outputted from the correcting means using a second sampling frequency that is higher than a frequency of said input data signal and lower than the first sampling frequency, and outputting a result of the sampling as the quantization data.

The amount of the foregoing quantization data increases with an increase of the first sampling frequency, and therefore, it may cause some inadequacies when performing signal relay, for example, in a remote control pass-through function. The foregoing arrangement using the second sampling means securely reduces the data amount by performing the second sampling compared to the case of simply transmitting the data after the correction, thereby securely preventing the foregoing defect.

The foregoing remote control signal reception circuit preferably further includes second sampling frequency setting means for setting the second sampling frequency. With this arrangement, the second sampling frequency may be set externally, while allowing flexible change according to a change in specification of a circuit for supplying an input data signal.

The foregoing remote control signal reception circuit preferably further includes sampling frequency producing means for producing the first sampling frequency by dividing a system clock. In this case, the sampling frequency 1 can be obtained by dividing the existing system clock, and therefore a separate circuit or the like for producing a reference clock signal is not required.

It is preferable that the second sampling frequency is equal to the first sampling frequency divided by an integer. In this case, the second sampling frequency may be obtained from the first sampling frequency. On this account, it is not necessary to provide a separate circuit or the like for producing a reference clock signal to obtain the second sampling frequency.

As described, a remote control signal reception method according to the present invention includes the steps of: (a) sampling an input data signal to carry out quantization of said input data signal using a first sampling frequency that is higher than a frequency of said input data signal, and storing a result of the quantization; and (b) carrying out correction of said result of the quantization that has been stored according to each result, and outputting a result of the correction as quantization data.

According to this invention, in the first sampling step, the received input data signal is subjected to quantization by being sampled with a first sampling frequency, and this result is stored. Then, the stored quantized data is subjected to correction with reference to the result of quantization in the next step, and is outputted as quantization data.

Since the correction of the quantized data is carried out with reference to the stored result of quantization, the correcting step is performed in a digital manner.

Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

It is preferable that, in the foregoing step (b), when said result of the quantization is low-level, a low-level is outputted as the quantization data, and when said result of the quantization is high-level, a change from high-level to low-level is detected and results of the quantization are modified from high-level to low-level for a predetermined number of sampling periods of the first sampling means, which number is counted backward from the change from high-level to low-level, and a result of modification is outputted as the quantization data.

In this case, when said result of the quantization is low-level, a low-level is outputted in the correcting step without correction, and when said result of the quantization is high-level, in the correcting step, a change from high-level to low-level is detected, and results of the quantization is modified from high-level to low-level for a predetermined number of sampling periods of the first sampling means, and then a result of modification is outputted as the quantization data.

The foregoing remote control reception method preferably includes a sampling step; and an AND calculation step for carrying out AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

In this case, the respective flip-flops function as storage means, and sampling of the input data signal is carried out in synchronism with a clock signal with a first sampling frequency, and the quantization data is outputted from the final-stage flip-flop. Further, the respective flip-flops are reset in the AND calculation step, and therefore, when the input data signal becomes low-level, the quantization data is corrected from high-level to low-level for the number= [number of flip-flops−1], which number is counted backward from the change in terms of sampling period. In this way, the same effect as above may be obtained with a significantly simple circuit structure.

As described, a remote control signal reception method according to the present invention includes a first sampling step; and a correcting step for detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

According to this invention, the received input data signal is subjected to quantization by being sampled with a first sampling frequency, and then is outputted as quantization data. Upon detection of a change of the quantization data from low-level to high-level, modification is carried out as a correcting step with respect to a predetermined number of results of the quantization from high-level to low-level, which number is counted forward from the change from low-level to high-level in units of a sampling period of the first sampling means, and a result of modification is outputted as the quantization data.

Since the correction of the quantized data is carried out with reference to the result of quantization, the correction is performed in a digital manner. Accordingly, the circuit does not require the plural complicated adjustments performed in the conventional analog processing, and also can be easily compatible with a digitalized device, thereby avoiding an increase of the number of components. Further, upon decipher of a remote control signal, that is generally performed by a CPU or a dedicated IC, the foregoing digitally-processed data may be used with such digital ICs without modification, thereby decreasing manufacturing cost compared to the analog processing. Furthermore, when the circuit is provided in a semiconductor, the characteristic will be constant, thus easing adjustment. Also, the circuit may be used with recently-developed various photoelectric conversion elements for converting an infrared light to an electric signal, since it allows adjustment according to the type of element.

Accordingly, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller. In this usage, the circuit is completely free from accumulation of error of the reception signal.

Besides, since the method does not need to perform a storing step for storing the quantized data regardless of the correction amount, it may be carried out as a simple method.

It is preferable that the foregoing correcting step includes the following sub-steps: a pre-settable counting step; a multiplexing step with respect to the quantization data and low-levels that have been supplied by outputting low-levels during the counting operation and outputting the quantization data in all other times; and an AND calculation step for performing AND calculation with respect to a result of the counting operation and the quantization data, and resetting the counting operation.

In this case, upon detection of a change from low-level to high-level, the counting operation starts, and the low-level is outputted in the multiplexing step, i.e., the quantization data is modified from high-level to low-level until the counting reaches the pre-set value. When the counter reaches the pre-set value, the counter is reset in the AND calculation step. With this arrangement with a counting step, it is not necessary to perform storing step for storing the quantized data regardless of the correction amount, thereby greatly and securely simplifying the method.

The foregoing remote control signal reception method preferably allows setting of the first sampling frequency. With this arrangement, the first sampling frequency may be set externally, while allowing flexible change according to a change in specification of a circuit for supplying an input data signal.

The foregoing remote control signal reception method preferably allows setting of an amount of the correction in the correcting step. With this arrangement, the correction amount may be set externally, while allowing flexible change according to a change in specification of a circuit for supplying an input data signal.

The foregoing remote control signal reception circuit preferably further includes a second sampling step for carrying out sampling with respect to the quantization data outputted from the correcting means using a second sampling frequency that is higher than a frequency of said input data signal and lower than the first sampling frequency, and outputting a result of the sampling as the quantization data.

The amount of the foregoing quantization data increases with an increase of the first sampling frequency, and therefore, it may cause some inadequacies when performing signal relay, for example, in a remote control pass-through function. The foregoing arrangement using the second sampling means securely reduces the data amount by performing the second sampling compared to the case of simply transmitting the data after the correction, thereby securely preventing the foregoing defect.

The foregoing remote control signal reception method preferably allows setting of the second sampling frequency. With this arrangement, the second sampling frequency may be set externally, while allowing flexible change according to a change in specification of a circuit for supplying an input data signal.

The foregoing remote control signal reception method preferably produces the first sampling frequency by dividing a system clock. In this case, the sampling frequency 1 can be obtained by dividing the existing system clock, and therefore a separate circuit or the like for producing a reference clock signal is not required.

In the foregoing remote control signal reception method, it is preferable that the second sampling frequency is equal to the first sampling frequency divided by an integer. In this case, the second sampling frequency may be obtained from the first sampling frequency. On this account, it is not necessary to provide a separate circuit or the like for producing a reference clock signal to obtain the second sampling frequency.

As described, a remote control signal reception program according to the present invention enforces one of the foregoing remote control signal reception circuits by causing a computer to function as the respective means or the circuit.

This program enforces the foregoing remote control signal reception circuit by causing a computer to function as the respective means or the circuit, thus realizing the foregoing remote control signal reception circuit.

As described, a computer-readable storage medium according to the present invention stores the foregoing remote control signal reception program.

By reading out the remote control signal reception program from the foregoing storage medium, the foregoing remote control signal reception circuit may be realized on a computer.

The remote control signal reception circuit etc. according to the present invention digitally carries out correction operation. On this account, even when the infrared reception signal fails to properly transmit the data of the transmission end due to the characteristic of the element, it is possible to appropriately correct the data and pass the data on to a later-stage decoder in a similar state to the data that the transmission end originally intended. Further, the circuit may be adopted for a device using a remote control signal relay function in which the remote control signal is transferred via a relay point to a device too distant to be operated by a remote controller, while avoiding accumulation of error of the reception signal.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A remote control signal reception circuit, comprising:
   first sampling means for sampling an input data signal to carry out quantization of said input data signal using a first sampling frequency that is higher than a frequency of said input data signal, and storing a result of the quantization in storing means; and
   correcting means for carrying out correction of said result of the quantization stored in said storing means according to each result, and outputting a result of the correction as quantization data, wherein:
   when said result of the quantization is low-level, the correcting means outputs a low-level as the quantization data, and when said result of the quantization is high-level, the correcting means detects a change from high-level to low-level, and modifies results of the quantization from high-level to low-level for a predetermined number of sampling periods of the first sampling means, which number is counted backward from the change from high-level to low-level, and then outputs a result of modification as the quantization data.

2. The remote control signal reception circuit as set forth in claim 1, further comprising:
   first sampling frequency setting means for setting the first sampling frequency.

3. The remote control signal reception circuit as set forth in claim 1, further comprising:
   correction amount setting means for setting an amount of the correction performed by the correcting means.

4. A remote control signal reception circuit, comprising:
   first sampling means for sampling an input data signal to carry out quantization of said input data signal using a first sampling frequency that is higher than a frequency of said input data signal, and storing a result of the quantization in storing means;
   correcting means for carrying out correction of said result of the quantization stored in said storing means according to each result, and outputting a result of the correction as quantization data, and
   second sampling means for carrying out sampling with respect to the quantization data outputted from the correcting means using a second sampling frequency that is higher than a frequency of said input data signal and lower than the first sampling frequency, and outputting a result of the sampling as the quantization data.

5. The remote control signal reception circuit as set forth in claim 4, further comprising:
   second sampling frequency setting means for setting the second sampling frequency.

6. The remote control signal reception circuit as set forth in claim 4, wherein:
   the second sampling frequency is equal to the first sampling frequency divided by an integer.

7. The remote control signal reception circuit as set forth in claim 1, further comprising:
   sampling frequency producing means for producing the first sampling frequency by dividing a system clock.

8. A remote control signal reception circuit, comprising:
   a sampling circuit including a plurality of flip-flops, connected to one another in a cascade manner, for sampling an input data signal using a first sampling frequency that is higher than a frequency of said input data signal, based on a clock signal having the first sampling frequency, and outputting an output signal of a final-stage flip-flop as quantization data; and
   an AND circuit for carrying out AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

9. The remote control signal reception circuit as set forth in claim 8, further comprising:
first sampling frequency setting means for setting the first sampling frequency.

10. The remote control signal reception circuit as set forth in claim 8, further comprising:
sampling frequency producing means for producing the first sampling frequency by dividing a system clock.

11. A remote control signal reception circuit, comprising:
first sampling means for sampling an input data signal to carry out quantization of said input data signal using a first sampling frequency that is higher than a frequency of said input data signal, and outputting a result of the quantization as quantization data; and
correcting means for detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

12. The remote control signal reception circuit as set forth in claim 11, wherein:
the correcting means includes:
a counter that is pre-settable and starts counting operation upon the change of the quantization data from low-level to high-level, and outputs high-levels during the counting operation and outputs a low-level when the counting operation is completed;
a multiplexer supplied with the quantization data and low-levels, and outputs the low-levels during the counting operation by the counter and outputs the quantization data at all other times; and
an AND circuit for carrying out AND calculation with respect to an output signal of the counter and the quantization data, and resetting the counter when the counting operation is completed at the change of the quantization data from high-level to low-level.

13. The remote control signal reception circuit as set forth in claim 11, further comprising:
first sampling frequency setting means for setting the first sampling frequency.

14. The remote control signal reception circuit as set forth in claim 11, further comprising:
correction amount setting means for setting an amount of the correction performed by the correcting means.

15. The remote control signal reception circuit as set forth in claim 11, further comprising:
second sampling means for carrying out sampling with respect to the quantization data outputted from the correcting means using a second sampling frequency that is higher than a frequency of said input data signal and lower than the first sampling frequency, and outputting a result of the sampling as the quantization data.

16. The remote control signal reception circuit as set forth in claim 15, further comprising:
second sampling frequency setting means for setting the second sampling frequency.

17. The remote control signal reception circuit as set forth in claim 15, wherein:
the second sampling frequency is equal to the first sampling frequency divided by an integer.

18. The remote control signal reception circuit as set forth in claim 11, further comprising:
sampling frequency producing means for producing the first sampling frequency by dividing a system clock.

19. A remote control signal reception method, comprising the steps of:
(a) sampling an input data signal to carry out quantization of said input data signal using a first sampling frequency that is higher than a frequency of said input data signal, and storing a result of the quantization; and
(b) carrying out correction of said result of the quantization that has been stored according to each result, and outputting a result of the correction as quantization data, wherein:
in the step (b), when said result of the quantization is low-level, a low-level is outputted as the quantization data, and when said result of the quantization is high-level, a change from high-level to low-level is detected and results of the quantization are modified from high-level to low-level for a predetermined number of sampling periods of the step (a), which number is counted backward from the change from high-level to low-level, and a result of modification is outputted as the quantization data.

20. The remote control signal reception method as set forth in claim 19, wherein:
said method allows setting of the first sampling frequency.

21. The remote control signal reception method as set forth in claim 19, wherein:
said method allows setting of an amount of the correction performed in the step (b).

22. A remote control signal reception method, comprising the steps of:
(a) sampling an input data signal to carry out quantization of said input data signal using a first sampling frequency that is higher than a frequency of said input data signal, and storing a result of the quantization; and
(b) carrying out correction of said result of the quantization that has been stored according to each result, and outputting a result of the correction as quantization data;
(c) carrying out second sampling with respect to the quantization data outputted through the step (b) using a second sampling frequency that is higher than a frequency of said input data signal and lower than the first sampling frequency, and outputting a result of the sampling as the quantization data.

23. The remote control signal reception method as set forth in claim 22, wherein:
said method allows setting of the second sampling frequency.

24. The remote control signal reception method as set forth in claim 22, wherein:
the second sampling frequency is equal to the first sampling frequency divided by an integer.

25. The remote control signal reception method as set forth in claim 19, wherein:
the first sampling frequency is produced by dividing a system clock.

26. A remote control signal reception method, comprising the steps of:
(a) carrying out sampling by a plurality of flip-flops, connected to one another in a cascade manner, with respect to an input data signal using a first sampling frequency that is higher than a frequency of said input data signal, based on a clock signal having the first sampling frequency, and outputting an output signal of a final-stage flip-flop as quantization data; and (b) carrying out an AND calculation with respect to an inversion signal of an output signal of a first-stage flip-flop and each output signal of a second and later stage flip-flops, and resetting the flip-flops when the first-stage flip-flop outputs a low-level and the second and later stage flip-flops output high-levels.

27. The remote control signal reception method as set forth in claim 26, wherein:
said method allows setting of the first sampling frequency.

28. The remote control signal reception method as set forth in claim 26, wherein:
the first sampling frequency is produced by dividing a system clock.

29. A remote control signal reception method, comprising the steps of:
(a) sampling an input data signal to carry out quantization of said input data signal using a first sampling frequency that is higher than a frequency of said input data signal, and outputting a result of the quantization as quantization data; and
(b) detecting a change of the quantization data from low-level to high-level, and modifying results of the quantization from high-level to low-level for a predetermined number of sampling periods of the first sampling means, which number is counted forward from the change from low-level to high-level, and then outputting a result of modification as the quantization data.

30. The remote control signal reception method as set forth in claim 29, wherein:
the step (b) includes the sub-steps of:
(i) carrying out pre-settable counting operation that starts upon the change of the quantization data from low-level to high-level, and outputting high-levels during the counting operation and outputting a low-level when the counting operation is completed;
(ii) carrying out multiplexing of the quantization data and low-levels that have been supplied, and outputting low-levels during the counting operation and outputting the quantization data in all other times; and
(iii) carrying out AND calculation with respect to a result of the counting operation and the quantization data, and resetting the counting operation when the counting operation is completed at the change of the quantization data from high-level to low-level.

31. The remote control signal reception method as set forth in claim 29, wherein:
said method allows setting of the first sampling frequency.

32. The remote control signal reception method as set forth in claim 29, wherein:
said method allows setting of an amount of the correction performed in the step (b).

33. The remote control signal reception method as set forth in claim 29, further comprising the step of:
(c) carrying out second sampling with respect to the quantization data outputted through the step (b) using a second sampling frequency that is higher than a frequency of said input data signal and lower than the first sampling frequency, and outputting a result of the sampling as the quantization data.

34. The remote control signal reception method as set forth in claim 33, wherein:
said method allows setting of the second sampling frequency.

35. The remote control signal reception method as set forth in claim 33, wherein:
the second sampling frequency is equal to the first sampling frequency divided by an integer.

36. The remote control signal reception method as set forth in claim 29, wherein:
the first sampling frequency is produced by dividing a system clock.

37. The remote control signal reception circuit as set forth in claim 1, further comprising:
second sampling means for carrying out sampling with respect to the quantization data outputted from the correcting means using a second sampling frequency that is higher than a frequency of said input data signal and lower than the first sampling frequency, and outputting a result of the sampling as the quantization data.

38. The remote control signal reception circuit as set forth in claim 37, further comprising:
second sampling frequency setting means for setting the second sampling frequency.

39. The remote control signal reception circuit as set forth in claim 37, wherein:
the second sampling frequency is equal to the first sampling frequency divided by an integer.

40. The remote control signal reception circuit as set forth in claim 4, further comprising:
first sampling frequency setting means for setting the first sampling frequency.

41. The remote control signal reception circuit as set forth in claim 4, further comprising:
correction amount setting means for setting an amount of the correction performed by the correcting means.

42. The remote control signal reception circuit as set forth in claim 4, further comprising:
sampling frequency producing means for producing the first sampling frequency by dividing a system clock.

43. The remote control signal reception method as set forth in claim 19, further comprising the step of:
(c) carrying out second sampling with respect to the quantization data outputted through the step (b) using a second sampling frequency that is higher than a frequency of said input data signal and lower than the first sampling frequency, and outputting a result of the sampling as the quantization data.

44. The remote control signal reception method as set forth in claim 43, wherein:
said method allows setting of the second sampling frequency.

45. The remote control signal reception method as set forth in claim 43, wherein:
the second sampling frequency is equal to the first sampling frequency divided by an integer.

46. The remote control signal reception method as set forth in claim 22, wherein:
said method allows setting of the first sampling frequency.

47. The remote control signal reception method as set forth in claim 22, wherein:
said method allows setting of an amount of the correction performed in the step (b).

48. The remote control signal reception method as set forth in claim 22, wherein:
the first sampling frequency is produced by dividing a system clock.

49. A remote control signal reception circuit, comprising:
first sampling means for sampling an input data signal to carry out quantization of said input data signal using a first sampling frequency that is higher than a frequency of said input data signal, and storing a result of the quantization in storing means;

correcting means for carrying out correction of said result of the quantization stored in said storing means according to each result, and outputting a result of the correction as quantization data, and correcting means for detecting a change of the quantization data from high-level to low-level, and modifies results of the quantization from high-level to low-level for a predetermined number of sampling periods of the first sampling means, which number is counted backward from the change from high-level to low-level, and then outputs a result of modification as the quantization data.

50. A remote control signal reception circuit comprising:

first sampling means for sampling an input data signal to carry out quantization of said input data signal using a first sampling frequency that is higher than a frequency of said input data signal, and storing a result of the quantization in storing means;

correcting means for carrying out correction of said result of the quantization stored in said storing means according to each result, and outputting a result of the correction as quantization data, and second sampling means for carrying out sampling with respect to the quantization data outputted from the correcting means using a second sampling frequency, and outputting a result of the sampling as the quantization data.

* * * * *